US009104618B2

(12) United States Patent
Sela et al.

(10) Patent No.: US 9,104,618 B2
(45) Date of Patent: Aug. 11, 2015

(54) MANAGING ACCESS TO AN ADDRESS RANGE IN A STORAGE DEVICE

(75) Inventors: Rotem Sela, Haifa (IL); Michael Holtzman, Cupertino, CA (US); Ron Barzilai, Cupertino, CA (US); Donald Ray Bryant-Rich, Haifa (IL)

(73) Assignee: SanDisk Technologies Inc., Plano, TX (US)

( * ) Notice: Subject to any disclaimer, the term of this patent is extended or adjusted under 35 U.S.C. 154(b) by 1083 days.

(21) Appl. No.: 12/338,738

(22) Filed: Dec. 18, 2008

(65) Prior Publication Data

US 2010/0161928 A1 Jun. 24, 2010

(51) Int. Cl.
*G06F 12/14* (2006.01)
*G06F 21/31* (2013.01)
(Continued)

(52) U.S. Cl.
CPC ........ *G06F 12/1441* (2013.01); *G06F 12/0246* (2013.01); *G06F 21/31* (2013.01); *G06F 21/6218* (2013.01); *G06F 2212/1016* (2013.01); *G06F 2212/2022* (2013.01); *G06F 2221/2107* (2013.01); *G06F 2221/2113* (2013.01); *G06F 2221/2129* (2013.01); *G06F 2221/2141* (2013.01); *G06F 2221/2149* (2013.01)

(58) Field of Classification Search
CPC ..... G06F 12/14–12/1491; G06F 21/30–21/46; G06F 21/60–21/645; G06F 2221/2113; G06F 2221/2129; G06F 2221/2141; G06F 2221/2145; G06F 2221/2149
USPC ................... 707/694, 781–788, 797, 999.09; 711/163–164, 200–210, 221
See application file for complete search history.

(56) References Cited

U.S. PATENT DOCUMENTS

| 4,575,621 A | 3/1986 | Dreifus |
| 4,780,905 A | 10/1988 | Cruts et al. |

(Continued)

FOREIGN PATENT DOCUMENTS

| CN | 1371056 A | 9/2002 |
| CN | 1465161 A | 12/2003 |

(Continued)

OTHER PUBLICATIONS

International Search Report and Written Opinion for PCT/US2010/057425, dated Mar. 17, 2011, 10 pages.

(Continued)

*Primary Examiner* — Aimee Li
*Assistant Examiner* — Nicholas Simonetti
(74) *Attorney, Agent, or Firm* — Brinks Gilson & Lione

(57) ABSTRACT

Enhanced configuration of security and access control for data in a storage device is disclosed. A request is received to access an addressable memory location in a storage media within the storage device. A set of addressable memory locations with contiguous addresses identified by an address range is associated with first and second characteristics. The first characteristic is applied if the addressable memory location is within the set of addressable memory locations, and an entity is currently authenticated to and authorized to access the set of addressable memory locations. The second characteristic is applied if the addressable memory location is within the set of addressable memory locations, and no entity is currently authenticated to and authorized to access the set of addressable memory locations. The set of addressable memory locations can also be a logical partition, where the first and second characteristics are stored in a logical partition table.

38 Claims, 9 Drawing Sheets

(51) Int. Cl.
*G06F 21/62* (2013.01)
*G06F 12/02* (2006.01)

(56) References Cited

U.S. PATENT DOCUMENTS

| | | | |
|---|---|---|---|
| 5,052,040 A | 9/1991 | Preston et al. | |
| 5,148,481 A | 9/1992 | Abraham et al. | |
| 5,237,609 A | 8/1993 | Kimura | |
| 5,473,692 A | 12/1995 | Davis | |
| 5,581,753 A | 12/1996 | Terry et al. | |
| 5,604,801 A | 2/1997 | Dolan et al. | |
| 5,684,742 A | 11/1997 | Bublitz et al. | |
| 5,687,235 A | 11/1997 | Perlman et al. | |
| 5,793,868 A | 8/1998 | Micali | |
| 5,857,020 A | 1/1999 | Peterson, Jr. | |
| 5,903,651 A | 5/1999 | Kocher | |
| 5,930,167 A | 7/1999 | Lee et al. | |
| 5,949,877 A | 9/1999 | Traw et al. | |
| 6,026,402 A | 2/2000 | Vossen et al. | |
| 6,038,551 A | 3/2000 | Barlow et al. | |
| 6,073,242 A | 6/2000 | Hardy et al. | |
| 6,094,724 A | 7/2000 | Benhammou et al. | |
| 6,134,550 A | 10/2000 | Van Oorschot et al. | |
| 6,189,097 B1 | 2/2001 | Tycksen, Jr. et al. | |
| 6,343,291 B1 | 1/2002 | Goldman | |
| 6,343,320 B1 | 1/2002 | Fairchild et al. | |
| 6,351,813 B1 | 2/2002 | Mooney | |
| 6,438,666 B2 | 8/2002 | Cassagnol et al. | |
| 6,449,720 B1 | 9/2002 | Sprague et al. | |
| 6,456,528 B1 | 9/2002 | Chen | |
| 6,457,126 B1 | 9/2002 | Nakamura et al. | |
| 6,470,449 B1 | 10/2002 | Blandford | |
| 6,481,632 B2 | 11/2002 | Wentker et al. | |
| 6,513,116 B1 | 1/2003 | Valente | |
| 6,564,314 B1 | 5/2003 | May et al. | |
| 6,584,495 B1 | 6/2003 | Bisset et al. | |
| 6,694,436 B1 | 2/2004 | Audebert | |
| 6,714,921 B2 | 3/2004 | Stefik et al. | |
| 6,779,113 B1 | 8/2004 | Guthery | |
| 6,785,790 B1* | 8/2004 | Christie et al. | 711/163 |
| 6,816,900 B1 | 11/2004 | Vogel et al. | |
| 6,865,555 B2 | 3/2005 | Novak | |
| 6,880,084 B1 | 4/2005 | Brittenham et al. | |
| 6,938,162 B1 | 8/2005 | Nagai et al. | |
| 6,970,891 B1 | 11/2005 | Deo et al. | |
| 6,988,175 B2 | 1/2006 | Lasser | |
| 7,010,809 B2 | 3/2006 | Hori et al. | |
| 7,036,020 B2 | 4/2006 | Thibadeau | |
| 7,051,157 B2 | 5/2006 | James | |
| 7,073,063 B2 | 7/2006 | Peinado | |
| 7,073,073 B1 | 7/2006 | Nonaka et al. | |
| 7,103,914 B2 | 9/2006 | Focke et al. | |
| 7,111,173 B1 | 9/2006 | Scheidt | |
| 7,124,170 B1 | 10/2006 | Sibert | |
| 7,124,301 B1 | 10/2006 | Uchida | |
| 7,215,771 B1 | 5/2007 | Hamlin | |
| 7,219,227 B2 | 5/2007 | Hori et al. | |
| 7,225,341 B2 | 5/2007 | Yoshino et al. | |
| 7,269,741 B2 | 9/2007 | Matsui et al. | |
| 7,296,160 B2 | 11/2007 | Hiltgen | |
| 7,322,042 B2 | 1/2008 | Srinivasan et al. | |
| 7,350,204 B2 | 3/2008 | Lambert et al. | |
| 7,363,365 B2 | 4/2008 | Ocko et al. | |
| 7,373,506 B2 | 5/2008 | Asano et al. | |
| 7,426,747 B2 | 9/2008 | Thibadeau | |
| 7,434,069 B2 | 10/2008 | Nessler | |
| 7,437,574 B2 | 10/2008 | Ronkka et al. | |
| 7,478,248 B2 | 1/2009 | Ziv et al. | |
| 7,484,090 B2 | 1/2009 | Ohmori et al. | |
| 7,493,656 B2 | 2/2009 | Goodwill et al. | |
| 7,506,128 B2 | 3/2009 | Deo et al. | |
| 7,523,072 B2 | 4/2009 | Stefik et al. | |
| 7,526,785 B1 | 4/2009 | Pearson et al. | |
| 7,546,334 B2 | 6/2009 | Redlich et al. | |
| 7,546,630 B2 | 6/2009 | Tabi | |
| 7,783,884 B2 | 8/2010 | Nakano et al. | |
| 7,814,557 B2 | 10/2010 | Sakamura et al. | |
| 7,917,964 B2 | 3/2011 | Takashima et al. | |
| 8,042,163 B1 | 10/2011 | Karr et al. | |
| 2002/0023219 A1 | 2/2002 | Treffers et al. | |
| 2002/0029340 A1 | 3/2002 | Pensak et al. | |
| 2002/0061105 A1 | 5/2002 | Nakamura | |
| 2002/0065730 A1 | 5/2002 | Nii | |
| 2002/0065867 A1* | 5/2002 | Chauvel | 709/104 |
| 2002/0136410 A1 | 9/2002 | Hanna | |
| 2002/0138729 A1 | 9/2002 | Miettinen et al. | |
| 2002/0184217 A1 | 12/2002 | Bisbee et al. | |
| 2002/0188856 A1 | 12/2002 | Worby | |
| 2002/0199001 A1 | 12/2002 | Wenocur et al. | |
| 2003/0023867 A1 | 1/2003 | Thibadeau | |
| 2003/0028699 A1 | 2/2003 | Holtzman | |
| 2003/0056114 A1 | 3/2003 | Goland | |
| 2003/0061504 A1 | 3/2003 | Sprigg et al. | |
| 2003/0149854 A1 | 8/2003 | Yoshino et al. | |
| 2003/0149869 A1 | 8/2003 | Gleichauf | |
| 2003/0172280 A1 | 9/2003 | Scheidt et al. | |
| 2003/0188117 A1 | 10/2003 | Yoshino et al. | |
| 2003/0196028 A1 | 10/2003 | Maeda et al. | |
| 2003/0200402 A1* | 10/2003 | Willman et al. | 711/154 |
| 2003/0212888 A1 | 11/2003 | Wildish et al. | |
| 2003/0212895 A1 | 11/2003 | Kisliakov | |
| 2003/0217011 A1 | 11/2003 | Peinado et al. | |
| 2004/0015694 A1 | 1/2004 | De Treville | |
| 2004/0026496 A1 | 2/2004 | Zuili | |
| 2004/0039911 A1 | 2/2004 | Oka et al. | |
| 2004/0044625 A1 | 3/2004 | Sakamura et al. | |
| 2004/0059946 A1 | 3/2004 | Price | |
| 2004/0064618 A1* | 4/2004 | Farrell et al. | 710/200 |
| 2004/0083370 A1 | 4/2004 | de Jong | |
| 2004/0103288 A1 | 5/2004 | Ziv et al. | |
| 2004/0132437 A1 | 7/2004 | Ohmori et al. | |
| 2004/0139021 A1 | 7/2004 | Reed et al. | |
| 2004/0143579 A1 | 7/2004 | Nakazawa | |
| 2004/0144840 A1 | 7/2004 | Lee et al. | |
| 2004/0193606 A1 | 9/2004 | Arai et al. | |
| 2004/0247129 A1 | 12/2004 | Patariu et al. | |
| 2005/0015415 A1 | 1/2005 | Garimella et al. | |
| 2005/0018472 A1 | 1/2005 | Lim | |
| 2005/0022025 A1 | 1/2005 | Hug | |
| 2005/0049931 A1 | 3/2005 | Wisnudel et al. | |
| 2005/0114677 A1* | 5/2005 | Kanai | 713/182 |
| 2005/0154875 A1 | 7/2005 | Chao | |
| 2005/0160281 A1 | 7/2005 | Thibadeau | |
| 2005/0180209 A1 | 8/2005 | Lasser | |
| 2005/0193025 A1 | 9/2005 | Mosek | |
| 2005/0209716 A1 | 9/2005 | Buhr et al. | |
| 2005/0210241 A1 | 9/2005 | Lee et al. | |
| 2005/0256838 A1 | 11/2005 | Lasser | |
| 2005/0262361 A1 | 11/2005 | Thibadeau | |
| 2005/0289354 A1 | 12/2005 | Borthakur et al. | |
| 2006/0036873 A1 | 2/2006 | Ho et al. | |
| 2006/0095793 A1* | 5/2006 | Hall | 713/190 |
| 2006/0107047 A1 | 5/2006 | Bar-El | |
| 2006/0112241 A1 | 5/2006 | Weiss et al. | |
| 2006/0120314 A1 | 6/2006 | Krantz et al. | |
| 2006/0126422 A1 | 6/2006 | Takagi et al. | |
| 2006/0129824 A1 | 6/2006 | Hoff et al. | |
| 2006/0161725 A1 | 7/2006 | Lee et al. | |
| 2006/0195907 A1 | 8/2006 | Delfs et al. | |
| 2006/0232826 A1 | 10/2006 | Bar-El | |
| 2006/0242066 A1 | 10/2006 | Jogand-Coulomb et al. | |
| 2006/0242068 A1 | 10/2006 | Jogand-Coulomb et al. | |
| 2006/0242151 A1* | 10/2006 | Jogand-Coulomb et al. | 707/9 |
| 2006/0262928 A1 | 11/2006 | Bar-El et al. | |
| 2006/0272027 A1 | 11/2006 | Noble | |
| 2007/0050849 A1 | 3/2007 | Takashima | |
| 2007/0061502 A1 | 3/2007 | Lasser et al. | |
| 2007/0143555 A1 | 6/2007 | Nemiroff et al. | |
| 2007/0180210 A1 | 8/2007 | Thibadeau | |
| 2007/0300219 A1 | 12/2007 | Devaux | |

(56) References Cited

U.S. PATENT DOCUMENTS

| | | | |
|---|---|---|---|
| 2008/0072060 A1 | | 3/2008 | Cannon et al. |
| 2009/0125730 A1* | | 5/2009 | Pagan .......................... 713/300 |
| 2009/0144347 A1* | | 6/2009 | Boyd et al. .................... 707/205 |

FOREIGN PATENT DOCUMENTS

| | | | |
|---|---|---|---|
| CN | 1934564 A | | 3/2007 |
| EP | 0 330 404 A2 | | 8/1989 |
| EP | 0 919 904 A2 | | 6/1999 |
| EP | 1 117 206 | | 7/2001 |
| EP | 1 209 657 A1 | | 5/2002 |
| EP | 1 361 527 | | 11/2003 |
| EP | 1 365 306 A2 | | 11/2003 |
| EP | 1 467 312 A1 | | 10/2004 |
| EP | 1 594 250 | | 11/2005 |
| GB | 2 391 082 A | | 1/2004 |
| JP | 09-298537 | | 11/1997 |
| JP | 10-327147 | | 12/1998 |
| JP | 11-039437 | | 2/1999 |
| JP | H11-161552 | | 6/1999 |
| JP | 2002-288453 A | | 4/2002 |
| JP | 2003-233594 | | 8/2003 |
| JP | 2003-316651 | | 11/2003 |
| JP | 2003-337632 | | 11/2003 |
| JP | 2003-345742 | | 12/2003 |
| JP | 2004-199138 | | 7/2004 |
| JP | 2004-266652 | | 9/2004 |
| JP | 2005-124097 | | 5/2005 |
| JP | 2005-352962 | | 12/2005 |
| JP | 2006-085647 | | 3/2006 |
| KR | 2004-0063071 A | | 7/2004 |
| TW | 588244 | | 5/2004 |
| TW | 200502758 A | | 1/2005 |
| TW | 200531496 | | 9/2005 |
| WO | WO 98/07255 | | 2/1998 |
| WO | WO 00/42491 | | 7/2000 |
| WO | WO 02/01368 A2 | | 1/2002 |
| WO | WO 02/42912 A1 | | 5/2002 |
| WO | WO 02/063847 | | 8/2002 |
| WO | WO 02/096016 | | 11/2002 |
| WO | WO 03/107589 | | 12/2003 |
| WO | WO 2004/034202 | | 4/2004 |
| WO | WO 2004/086228 A1 | | 10/2004 |
| WO | WO 2004/112036 A1 | | 12/2004 |
| WO | WO 2005/104431 A1 | | 11/2005 |
| WO | WO 2006/066604 | | 6/2006 |
| WO | WO 2006/069194 | | 6/2006 |
| WO | WO 2006/069274 | | 6/2006 |
| WO | WO 2006/069311 | | 6/2006 |
| WO | WO 2006/069312 | | 6/2006 |
| WO | WO 2009/070430 A2 | | 6/2009 |

OTHER PUBLICATIONS

Office Action for U.S. Appl. No. 12/624,036, dated Apr. 1, 2011, 24 pages.
Office Action for U.S. Appl. No. 11/557,006, dated Jun. 25, 2010, 14 pages.
Office Action for U.S. Appl. No. 11/557,049, dated Jul. 7, 2010, 29 pages.
Translation of Office Action for Chines Patent Application Serial No. 200780025287.1, dated Jun. 12, 2010, 5 pages.
Translation of Office Action for Chines Patent Application Serial No. 200780025765.9, dated Jul. 20, 2010, 4 pages.
Translation of Office Action for Chines Patent Application Serial No. 200780025785.6, dated Jun. 24, 2010, 4 pages.
Translation of Office Action for Chines Patent Application Serial No. 200780025848.8, dated Jul. 20, 2010, 1 page.
European Examination Report for European Patent Application Serial No. 05 855 274.6, dated Jun. 14, 2010, 4 pages.
Posey, Brien, "Understanding MS Windows File Associations", *Microsoft Technet. TechRepublic*, Sep. 1999, 11 pages.
Office Action for U.S. Appl. No. 11/313,538, dated Jun. 8, 2009, 29 pages.
Office Action for U.S. Appl. No. 11/314,052, dated May 12, 2009, 11 pages.
Office Action for U.S. Appl. No. 11/314,410, dated May 13, 2009, 15 pages.
Office Action for U.S. Appl. No. 11/314,411, dated Jun. 23, 2009, 36 pages.
Office Action for U.S. Appl. No. 11/313,538, dated May 24, 2010, 34 pages.
Office Action for U.S. Appl. No. 11/314,052, dated Jun. 8, 2010, 13 pages.
Office Action for U.S. Appl. No. 11/557,028, dated May 24, 2010, 17 pages.
Office Action for U.S. Appl. No. 11/557,041, dated Jun. 9, 2010, 17 pages.
European Examination Report for European Patent Application No. 05 855 098.9, dated Apr. 15, 2010, 6 pages.
European Examination Report for European Patent Application No. 10 002 604.6, dated May 4, 2010, 6 pages.
CardWerk, "ISO 7816-4: Inter-Industry Commands for Interchange, Section 3: Definitions," 2009, http://www.cardwerk.com/smartcards/smartcard_standard_ISO7816-4_3_definitions.aspx.
Office Action for U.S. Appl. No. 11/313,538, dated Feb. 10, 2011, 33 pages.
Office Action for U.S. Appl. No. 11/557,006, dated Feb. 15, 2011, 14 pages.
Office Action for U.S. Appl. No. 11/557,028, dated Feb. 22, 2011, 17 pages.
Office Action for U.S. Appl. No. 11/557,041, dated Feb. 4, 2011, 14 pages.
Office Action for U.S. Appl. No. 11/557,049, dated Dec. 17, 2009, 31 pages.
Kocher, P., "On Certificate Revocation and Validation", Lecture Notes in Computer Science, Springer Berlin Heidelberg, 1998.
Random Number Generator, Seed. In Webster's New World™ Computer Dictionary. Wiley Publishing, Inc., 2003.
Buhse, "Implications of Digital Rights Management for Online Music-A Business Perspective", T. Sander (Ed.), Security and Privacy in Digital Rights Management, ACM CCS-8 Workshop DRM 2001 LNCS 2320, pp. 201-212.
International Search Report and Written Opinion for PCT/US2007/015301, dated Jan. 10, 2008, 12 pages.
International Search Report and Written Opinion for PCT/US2007/015304, dated Mar. 25, 2008, 12 pages.
International Search Report and Written Opinion for PCT/US2007/015431, dated Apr. 16, 2008, 14 pages.
International Search Report and Written Opinion for PCT/US2007/015432, dated Jan. 17, 2008, 13 pages.
International Search Report and Written Opinion from PCT Application No. PCT/US2007/015430, dated Jan. 17, 2008, 11 pages.
Office Action for U.S. Appl. No. 11/313,538, dated Oct. 29, 2007.
Office Action for U.S. Appl. No. 11/313,870, dated Oct. 29, 2007.
Office Action for U.S. Appl. No. 11/314,055, dated Oct. 29, 2007.
Office Action for U.S. Appl. No. 11/314,053, dated Nov. 9, 2007.
Office Action for U.S. Appl. No. 11/313,536, dated Oct. 17, 2007.
US Office Action for U.S. Appl. No. 11/313,538 dated Apr. 9, 2008, 16 pages.
US Office Action for U.S. Appl. No. 11/313,870 dated Apr. 1, 2008, 13 pages.
US Office Action for U.S. Appl. No. 11/313,536 dated Apr. 14, 2008, 13 pages.
US Office Action for U.S. Appl. No. 11/314,055 dated Apr. 1, 2008, 16 pages.
US Office Action for U.S. Appl. No. 11/314,053 dated Feb. 7, 2008, 16 pages.
Office Action for U.S. Appl. No. 11/313,538, dated Nov. 20, 2008, 27 pages.
Office Action for U.S. Appl. No. 11/557,056, dated Mar. 16, 2009, 25 pages.
Dialog OneSearch, Jun. 2006, 50 pages, http://www.dialog.com.dwpi/.
Dialog OneSearch, Jun. 26, 2006, 5 pages, http://www.dialog.com.dwpi/.

(56) References Cited

OTHER PUBLICATIONS

Dialog OneSearch, Sep. 12, 2006, 56 pages, http://www.dialog.com.dwpi/.
Dialog OneSearch, Sep. 15, 2006, 55 pages, http://www.dialog.com.dwpi/.
Donnan, R.A., "Transmission Synchronizing Method", *IBM Technical Disclosure Bulletin*, vol. 11, No. 11, pp. 1570, Apr. 1969.
EPO/ISA, "Invitation to Pay Additional Fees", for International Application No. PCT/US2005/046689 mailed Jul. 11, 2006, 5 pages.
EPO/ISA, "Invitation to Pay Additional Fees", for International Application PCT/US2005/146478 mailed Jul. 11, 2006, 5 pages.
EPO/ISA, "Notification of Transmittal of International Search Report and the Written Opinion of the International Searching Authority, or the Declaration", for International Application No. PCT/US2005/046478 mailed Sep. 25, 2006, 14 pages.
EPO/ISA, "Notification of Transmittal of International Search Report and the Written Opinion of the International Searching Authority, or the Declaration", for International Application No. PCT/US2005/046793 mailed Jun. 7, 2006, 9 pages.
EPO/ISA, "Notification of Transmittal of International Search Report and the Written Opinion of the International Searching Authority, or the Declaration", for International Application No. PCT/US2005/046795 mailed Jun. 7, 2006, 9 pages.
EPO/ISA, "Notification of Transmittal of the International Search Report and the Written Opinion of the International Searching Authority, or the Declaration", for International Application No. PCT/US2005/046689 mailed Sep. 6, 2006, 16 pages.
Hinarejos et al., "Revocation Scheme for PMI Based Upon the Tracing Certificates Chains", Computational Science and Its Applications—ICCSA 2006, International Conference, Proceedings (Lecture Notes in Computer Science, vol. 3983), pp. 1098-1106.
Housley et al., "Internet X.509 Public Key Infrastructure Certificate and CRL Profile", Network Working Group, RFC 2459, The Internet Society, Jan. 1999, 137 pages.
International Telecommunication Union, "Series X: Data Networks, Open System Communications and Security (Information Technology—Open Systems Interconnection—The Directory: Public-Key and Attribute Certificate Frameworks)," ITU-T, X.509, Aug. 2005, pp. 1-170.
Kikuchi, H. et al., "Performance Evaluation of Public-Key Certificate Revocation System with Balanced Hash Tree",*Parallel Processing, 1999 International Workshop on Aizu-Wakamatsu*, pp. 204-209, 1999.
Llloyd, S. et al., "Understanding Certification Path Construction", *PKI Forum*, pp. 1-14, Sep. 2002.
Oasis, "Web Services Security X.509 Certificate Token Profile", OASIS Standard 200401, Mar. 15, 2004, 16 pages.
Oritz, "An Introduction to Java Card Technology—Part 1", May 29, 2003, 17 pages. Http://developers.su.com/techtopics/mobility/javacard/articles/javacard1/.
Orlowski, "Everything You Ever Wanted to Know About CPRM, But ZDNet Wouldn't Tell You . . . ", The Register, Jan. 10, 2001, 6 pages. Http://theregister.co.uk/2001/01/10/_everything_you_ever_wanted/print.html.
RSA Laboratories, "PKCS#1: RSA Encryption Standard", An RSA Laboratories Technical Note, Version 1.5, Revised Nov. 1, 1993, 17 pages.
Sandhu et al., "Access Control: Principles and Practice", IEEE Communications Magazine, IEEE Service Center, New York, NY, vol. 32, No. 9, Sep. 1, 1994, pp. 40-48 (2-5).
Thomas, T., "A Mandatory Access Control Mechanism for the Unix® File System", *Proceedings of the Aerospace Computer Security Applications Conference*, Orlando, Dec. 12-16, 1988, Washington, *IEEE Comp. Soc. Press*, US, pp. 173-177, Dec. 12, 1988.
Van Maffaert, A. et al., "Digital Rights Management: DRM is a Key Enabler for the Future Growth of the Broadband Access Market, and the Telecom/Networking Marking in General", Alcatel Telecommunications Review, Alcatel, Paris Cedex, FR, Apr. 2003, 8 pages.
Office Action for U.S. Appl. No. 11/314,411, dated Jan. 4, 2011, 29 pages.
Office Action for U.S. Appl. No. 11/314,052, dated Nov. 18, 2010, 14 pages.
Office Action for U.S. Appl. No. 11/557,051, dated Sep. 29, 2009, 10 pages.
Office Action for U.S. Appl. No. 11/557,039, dated Oct. 13, 2009, 14 pages.
Office Action for U.S. Appl. No. 11/557,052, dated Sep. 29, 2009, 9 pages.
Office Action for U.S. Appl. No. 11/557,041, dated Oct. 13, 2009, 19 pages.
Office Action for U.S. Appl. No. 11/557,028, dated Nov. 10, 2009, 19 pages.
Office Action for U.S. Appl. No. 11/313,538, dated Jan. 13, 2010, 33 pages.
Office Action for U.S. Appl. No. 11/314,052, dated Feb. 18, 2010, 13 pages.
Office Action for U.S. Appl. No. 11/314,410, dated Mar. 5, 2010, 17 pages.
Office Action for U.S. Appl. No. 11/314,411, dated Feb. 25, 2010, 28 pages.
Office Action for U.S. Appl. No. 11/557,010, dated Feb. 16, 2010, 13 pages.
Office Action for U.S. Appl. No. 11/557,052, dated Mar. 9, 2010, 9 pages.
International Search Report and Written Opinion for PCT/US2009/006010, dated Mar. 23, 2010, 9 pages.
Office Action for Chinese Patent Application Serial No. 200580048232.3, dated Dec. 1, 2011, 14 pages.
Office Action for Chinese Patent Application Serial No. 200780025287.1, dated Sep. 28, 2011, 10 pages.
Notification of Reasons for Refusal for Japanese Patent Application Serial No. 2009-518355, dated Oct. 25, 2011, 5 pages.
Notification of Reasons for Refusal for Japanese Patent Application Serial No. 2009-518357, dated Oct. 25, 2011, 4 pages.
Office Action for U.S. Appl. No. 11/557,052, dated Apr. 27, 2011, 10 pages.
Office Action for Japanese Patent Application Serial No. 2007-548491, dated Mar. 22, 2011, 4 pages.
Office Action for Japanese Patent Application Serial No. 2007-548523, dated Mar. 22, 2011, 4 pages.
Office Action for Japanese Patent Application Serial No. 2010-049119, dated Mar. 22, 2011, 7 pages.
Office Action for Japanese Patent Application Serial No. 2010-548449, dated Mar. 22, 2011, 7 pages.
Office Action for U.S. Appl. No. 11/314,411, dated Jul. 29, 2011, 37 pages.
Notice of Allowance for U.S. Appl. No. 11/313,538, dated Aug. 17, 2011, 9 pages.
Office Action for U.S. Appl. No. 11/557,028, dated Aug. 15, 2011, 21 pages.
Office Action for Chinese Patent Application Serial No. 2007800257165.9 dated May 17, 2011, 11 pages.
Office Action for U.S. Appl. No. 11/557,041, dated Aug. 25, 2011, 14 pages.
Office Action for Chinese Patent Application Serial No. 200780025736.2, dated Jul. 13, 2011, 5 pages.
Examination Report for European Patent Application Serial No. 05855366.0, dated Aug. 17, 2011, 9 pages.
Office Action for European Patent Application Serial No. 10190137.9, dated Sep. 7, 2011, 6 pages.
Office Action for European Patent Application Serial No. 07835981.7, dated Aug. 24, 2011, 9 pages.
Office Action for U.S. Appl. No. 11/557,049, dated Oct. 21, 2011, 31 pages.
Office Action for U.S. Appl. No. 11/557,006, dated Dec. 19, 2011, 11 pages.
Office Action for U.S. Appl. No. 12/641,160, dated Jan. 5, 2012, 14 pages.
Notification of Reasons for Refusal for Japanese Patent Application Serial No. 2009-518323, dated Dec. 20, 2011, 7 pages.

(56) References Cited

OTHER PUBLICATIONS

Kikuchi, H. et al., "Performance Evaluation of Public-Key Certificate Revocation System with Balanced Hash Tree", *Parallel Processing, 1999. Proceedings. 1999 International Workshops*, Sep. 24, 1999, pp. 204-209.

Umezawa, K. et al., "Development and Evaluation of Certificate Verification System in Mobile Environment", *Computer Security Symposium 2005 (CSS2005)* vol. I of II, Japan, *Information Processing Society of Japan*, vol. 2005, No. 13, Oct. 26, 2005, pp. 121-127 (Abstract Only).

Office Action for U.S. Appl. No. 11/314,411, dated Feb. 29, 2012, 41 pages.

Notice of Allowance for U.S. Appl. No. 11/557,028, dated Feb. 3, 2012, 10 pages.

Office Action for U.S. Appl. No. 11/557,052, dated Jan. 30, 2012, 13 pages.

Office Action for U.S. Appl. No. 12/624,036, dated Jan. 18, 2012, 31 pages.

Decision of Refusal for Japanese Patent Application Serial No. 2009-518324, dated Dec. 25, 2012, 4 pages.

Notice of Final Rejection for Korean Patent Application Serial No. 10-2007-7016639, dated Dec. 21, 2012, 6 pages.

Office Action for Taiwanese Patent Application Serial No. 094145711, dated Nov. 26, 2012, 15 pages.

Office Action for Chinese Patent Application Serial No. 200780025736.2, dated Dec. 5, 2012, 5 pages.

Office Action for U.S. Appl. No. 11/557,049, dated Jan. 31, 2013, 29 pages.

Decision of Rejection for Chinese Office Action Serial No. 200780025785.6, dated Jan. 18, 2012, 11 pages.

Decision of Refusal for Japanese Patent Application Serial No. 2009-518357, dated Feb. 14, 2012, 8 pages.

Office Action for Taiwanese Patent Application Serial No. 094145710, dated Jan. 10, 2012, 16 pages.

Office Action for U.S. Appl. No. 11/557,049, dated May 21, 2012, 31 pages.

Office Action for Japanese Patent Application Serial No. 2009-518324, dated May 29, 2012, 6 pages.

Office Action for Korean Patent Application Serial No. 10-2009-7026878, dated Apr. 27, 2012, 5 pages.

Office Action for Korean Patent Application Serial No. 10-2007-7016639, dated Apr. 27, 2012, 7 pages.

Office Action for U.S. Appl. No. 11/314,052, dated Aug. 8, 2012, 14 pages.

Notice of Allowance for U.S. Appl. No. 11/557,052, dated Jul. 20, 2012, 7 pages.

Office Action for Chinese Patent Application Serial No. 200910211956.5, dated Apr. 23, 2012, 6 pages.

Notice of Preliminary Rejection for Korean Patent Application Serial No. 10-2007-7016633, dated Jun. 13, 2012, 7 pages.

Notice of Preliminary Rejection for Korean Patent Application Serial No. 10-2007-7016643, dated Jun. 19, 2012, 7 pages.

Office Action for Chinese Patent Application Serial No. 200780025287.1, dated Jul. 4, 2012, 14 pages.

Office Action for Chinese Patent Application Serial No. 200910261304.2, dated Jun. 21, 2012, 6 pages.

Office Action for Taiwanese Patent Application Serial No. 094145707, dated Aug. 21, 2012, 7 pages.

Office Action for Taiwanese Patent Application Serial No. 094145710, dated Aug. 15, 2012, 16 pages.

Office Action for U.S. Appl. No. 12/641,160, dated Sep. 13, 2012, 10 pages.

Office Action for U.S. Appl. No. 11/314,411, dated Oct. 15, 2012, 42 pages.

Office Action for U.S. Appl. No. 11/557,041, dated Oct. 12, 2012, 20 pages.

Office Action for Korean Patent Application Serial No. 2009-7002319, dated Nov. 19, 2012, 7 pages.

Notification of Reasons for Refusal for Japanese Patent Application Serial No. 2009518356, dated Nov. 20, 2012, 8 pages.

Micron Technology Inc., "C400 1.8-Inch NAND Flash Self-Encrypting Drive SSD [product data sheet]", *Micron Technology, Inc.*, 2011, entire document, http://www.micron.com/~/media/Documents/Products/Data%20Sheet/SSD/C400_1_8.pdf.

Notice of Allowance for U.S. Appl. No. 11/314,411 dated May 8, 2013, 16 pages.

Office Action for Taiwanese Patent Application Serial No. 094145711 dated May 17, 2013, 3 pages.

Summons to Attend Oral Proceedings Pursuant to Rule 115(1) EPC for European Patent Application Serial No. 05 855 098.9 dated May 31, 2013, 7 pages.

Office Action for Chinese Patent Application Serial No. 200910211956.5, dated Feb. 5, 2013, 6 pages.

Office Action for U.S. Appl. No. 11/314,052, dated Mar. 22, 2013, 15 pages.

Office Action for U.S. Appl. No. 11/557,041, dated Mar. 28, 2013, 22 pages.

English Translation of Office Action for Chinese Patent Application Serial No. 200980151089.9 dated Jul. 30, 2013, 12 pages.

Office Action for Taiwanese Patent Application Serial No. 096124585 dated Sep. 18, 2013, 1 page.

Notice of Allowance for U.S. Appl. No. 11/557,041 dated Oct. 10, 2013, 9 pages.

Notice of Allowance for U.S. Appl. No. 11/557,049 dated Jul. 31, 2013, 8 pages.

Search Report (including translation) for Taiwanese Patent Application Serial No. 096124595 dated Aug. 2, 2013, 6 pages.

Summons to Attend Oral Proceedings Pursuant to Rule 115(1) EPC for European Patent Application Serial No. 07 835 952.8 dated Aug. 9, 2013, 7 pages.

Notice of Allowance for U.S. Appl. No. 11/314,052 dated Aug. 20, 2013, 9 pages.

Office Action for Chinese Patent Application Serial No. 099101123 dated Jul. 12, 2013, 18 pages.

Search Report for Taiwanese Patent Application Serial No. 096124596 dated Aug. 15, 2013, 1 page.

Office Action for Chinese Patent Application Serial No. 200980151089.9 dated Sep. 23, 2014, 5 pages.

Summons to Oral Proceeding for European Patent Application Serial No. 05 855 366.0 dated Oct. 15, 2013, 6 pages.

Decision of Refusal for European Patent Application Serial No. 05 855 098.9 dated Oct. 25, 2013, 10 pages.

Office Action for European Patent Application Serial No. 07 835 955.1 dated Nov. 5, 2013, 6 pages.

English Translation of Search Report for Taiwanese Patent Application Serial No. 096124594 dated Nov. 18, 2013, 1 page.

Office Action for European Patent Application Serial No. 07 835 952.8 dated Dec. 4, 2013, 10 pages.

Office Action for European Patent Application Serial No. 09 796 144.5 dated Dec. 11, 2013, 5 pages.

Office Action for U.S. Appl. No. 11/314,410 dated Dec. 17, 2013, 6 pages.

Notice of Allowance for U.S. Appl. No. 11/557,041 dated Dec. 30, 2013, 2 pages.

Office Action for U.S. Appl. No. 12/624,036 dated Jan. 2, 2014, 23 pages.

Office Action for European Patent Application Serial No. 10 002 604.6 dated Nov. 18, 2013, 7 pages.

English Translation of Search Report for Taiwanese Patent Application Serial No. 096124586 dated Oct. 29, 2013, 1 page.

English Translation of Office Action for Chinese Patent Application Serial No. 2009801510899 dated Feb. 8, 2014, 2 pages.

Decision for Refusal for European Patent Application Serial No. 05 855 366.0 dated Feb. 18, 2014, 12 pages.

Office Action for U.S. Appl. No. 11/314,410 dated Mar. 18, 2014, 15 pages.

Office Action for U.S. Appl. No. 12/641,160 dated Apr. 21, 2014, 9 pages.

(56) References Cited

OTHER PUBLICATIONS

Search Report issued in Chinese Patent Application No. 200780025785.6, dated Jun. 5, 2014, 2 pages.
Office Action for U.S. Appl. No. 12/641,160 dated Aug. 12, 2014, 10 pages.
Office Action for Chinese Patent Application Serial No. 201080057808.3 dated Sep. 26, 2014, 9 pages.
Office Action for U.S. Appl. No. 12/624,036 dated Oct. 2, 2014, 24 pages.
Restriction Requirement for U.S. Appl. No. 14/067,574 dated Oct. 17, 2014, 6 pages.
Office Action for U.S. Appl. No. 11/314,410 dated Oct. 24, 2014, 4 pages.
English Translation of Search Report for Chinese Patent Application Serial No. 201210277333.X dated Nov. 4, 2014, 2 pages.
Office Action for U.S. Appl. No. 14/067,574 dated Dec. 24, 2014, 18 pages.
Office Action for European Patent Application U.S. Appl. No. 07 810 187.0 dated Dec. 3, 2014, 4 pages.
Office Action for U.S. Appl. No. 11/314,410 dated Mar. 2, 2015, 18 pages.

* cited by examiner

MANAGING ACCESS TO AN ADDRESS RANGE IN A STORAGE DEVICE

TECHNICAL FIELD

This application relates generally to the operation of non-volatile flash memory systems, and, more specifically, to managing access to an address range in a storage device.

BACKGROUND

There are many commercially successful non-volatile memory products being used today, particularly in the form of small form factor cards, which employ flash EEPROM (Electrically Erasable and Programmable Read Only Memory) cells formed on one or more integrated circuit devices. Some of the commercially available card formats include CompactFlash (CF) cards, MultiMedia cards (MMC), Secure Digital (SD) cards, and personnel tags (P-Tag). Hosts that may incorporate or access non-volatile small form factor cards include personal computers, notebook computers, personal digital assistants (PDAs), various data communication devices, digital cameras, cellular telephones, portable audio players, automobile sound systems, and similar types of equipment. In some systems, a removable card does not include a controller and the host controls operation of the memory in the card. Examples of this type of memory system include Smart Media cards and xD cards. Thus, control of the memory may be achieved by software on a controller in the card or by control software in the host. Besides a memory card implementation, this type of memory can alternatively be embedded into various types of host systems. In both removable and embedded applications, host data may be stored in the memory according to a storage scheme implemented by memory controller software and/or hardware. The data stored within a card is accessed via an interface that is controlled by a program and, in some cases, security hardware or software.

The increase in storage density of non-volatile memory cards allows an ever-growing number of host applications to make use of the additional storage space. For example, the additional storage may be utilized for MP3 audio files, high-resolution images files, video files, and documents, and a variety of advanced cellular telephone services, such as storing Multimedia Messaging Service (MMS) object attachments, and providing full personal information management (PIM) functionality, such as e-mail contact lists and calendars. A variety of applications may therefore share access to the non-volatile storage device and access data or store and manage their own data. While each application may share the overall quantity of storage space in a non-volatile memory card, the bandwidth, power consumption, and file security requirements of each application may differ.

For example, handheld computing devices such as cellular telephones may provide content storage, perhaps in a removable non-volatile storage device, in order to increase the average revenue by generating more data exchanges on a mobile network. This content includes valuable data, which may be data owned by a party other than the one that manufactures or sells the non-volatile storage device. Therefore, the content in a non-volatile storage device may need to be protected from access by unauthorized users or applications. On the other hand, an application to take pictures with a cellular telephone camera may need to allow other applications to access the picture files stored in the non-volatile storage card. In another example, applications such as video players may require high-bandwidth, low-latency access to non-volatile storage. At the same time, other applications that share access to the non-volatile storage, such as telephone address books, may have less demanding bandwidth and latency requirements. As shown by these examples, the number of host applications accessing a non-volatile storage device is increasing, as are the quantity and types of data that can be stored in a non-volatile storage device. Further, the requirements of increasingly complex applications extend beyond the mere quantity of storage space required. For example, if a non-volatile storage card does not recognize or accommodate these differing application requirements, the security of the data stored on the card may be compromised, or bandwidth may be misallocated among the applications sharing access to the non-volatile storage card.

SUMMARY

In order to address these issues, there is a need to define characteristics associated with address ranges of non-volatile storage within a non-volatile storage device. The characteristics may be applied to control functionality such as encryption, power consumption, bandwidth consumption, and access permissions when processing a request to read data from or write data to a defined address range. The storage space associated with an address range may be utilized by one or more applications. In doing so, storage device characteristics such as security, performance and power consumption may be customized for the requirements of the applications accessing that address range. The characteristics applied may depend on whether an entity is currently authenticated and authorized to access the address range. If one application is currently authenticated and authorized to access an address range, all entities accessing that address range may have a first set of characteristics applied during an access to that address range. If no application is currently authenticated and authorized to access an address range, any entity accessing that address range may have a second set of characteristics applied during an access to that address range. The application of a first or second characteristic set depending on an entity being currently authenticated and authorized to access an address range provides further control of and flexibility in the behavior of the non-volatile storage device. The concept(s) presented herein can be implemented in various embodiments, and this summary includes a number of exemplary embodiments.

In one embodiment, a storage device receives a request to access an addressable memory location in a storage media within the storage device, where the storage media contains addressable memory locations, and where a set of addressable memory locations with contiguous addresses identified by an address range is associated with a first characteristic and a second characteristic. The first characteristic is applied if the addressed memory location is within the set of addressable memory locations, and any entity is currently authenticated to and authorized to access the set of addressable memory locations. The second characteristic is applied if the addressed memory location is within the set of addressable memory locations, and no entity is currently authenticated to and authorized to access the set of addressable memory locations. In one embodiment, a default characteristic is applied if the addressed memory location is not within the set of addressable memory locations. In another embodiment, the storage device authenticates the entity to the set of addressable memory locations. An access control record from a tree is used to authenticate the entity to the set of addressable memory locations. The tree contains hierarchically organized nodes, where each node includes at least one access control record, where an access control record includes credentials and permissions for authenticating the entity and authorizing entity access to data stored in the set of addressable memory locations. A storage device may also receive a request by an entity to change at least one of the first characteristic and the second characteristic, and the request is granted if the entity is currently authenticated and authorized to do so.

In another embodiment, a request is received to access an addressable memory location in a storage media within the storage device, where the storage media comprises addressable memory locations, and where a logical partition includes a set of addressable memory locations that has contiguous addresses identified by an address range and that is associated with a first characteristic and a second characteristic. If an entity is currently authenticated and authorized to access the logical partition, the first characteristic is retrieved from a logical partition table. The logical partition table includes a plurality of entries, where each entry includes a logical partition identifier associated with the logical partition, the address range, the first characteristic, and the second characteristic. The first characteristic is applied in response to the request. If the entity is not currently authenticated to and authorized to access the logical partition, the second characteristic is retrieved from the logical partition table entry corresponding to the logical partition to be accessed, and the second characteristic is applied in response to the request. In yet another embodiment, a default characteristic is applied if the addressed memory location is not within the logical partition. In one embodiment, the storage device authenticates the entity to the logical partition. In this embodiment, the storage device uses an access control record from a tree to authenticate the entity to the logical partition, where the tree contains nodes organized hierarchically therein, each node including at least one access control record, where the access control record includes credentials and permissions for authenticating the entity and authorizing entity access to data stored in the logical partition.

In another embodiment, a storage device with a storage media having addressable memory locations receives a request from an entity to create an association between a set of one or more addressable memory locations and a first characteristic and a second characteristic. The set of one or more addressable memory locations is identified by an address range of contiguous addresses. The storage device grants the request if the entity is currently authenticated and authorized to create the association. If the request to create the association is granted, the first characteristic can be applied in response to a request to access to an addressable memory location within the address range if any entity is authenticated to and authorized to access the address range. Additionally, the second characteristic can be applied in response to a request to access to the addressable memory location within the address range if no entity is authenticated to and authorized to access the address range.

In one embodiment, a request from an entity is received to change at least one of the first characteristic and the second characteristic. The request is granted if the entity is currently authenticated to and authorized to do so. In another embodiment, a request from an entity is received to create the logical partition. The request is granted if the entity is currently authenticated and authorized to create the logical partition. The storage device may authenticate the entity using an access control record from a tree, where the tree contains hierarchically organized nodes, each node including at least one access control record, wherein the access control record includes credentials and permissions for authenticating the entity and authorizing the entity. The storage device may authorize the entity, and create, access, or change the logical partition using an access control record.

In another embodiment, a storage device includes a storage media and a controller. The storage media has addressable memory locations, where a set of one or more of which is identified by an address range of contiguous addresses associated with a first characteristic and a second characteristic. The controller is operable to receive a request to access an addressable memory location in the storage media, apply the first characteristic if the addressable memory location is within the set of addressable memory locations and at that time any entity is authenticated to and authorized to access the set of addressable memory locations, apply the second characteristic if the addressable memory location is within the set of addressable memory locations and at that time no entity is authenticated to and authorized to access the set of addressable memory locations.

Other embodiments, and features and advantages thereof are possible and will be, or will become, apparent to one with skill in the art upon examination of the following figures and detailed description. Hence, it is intended that the scope of the claimed invention as recited in the claims below will not be limited to the embodiments shown and described herein.

BRIEF DESCRIPTION OF THE DRAWINGS

The components in the figures are not necessarily to scale, emphasis instead being placed upon illustrating various aspects thereof. Moreover, in the figures, like referenced numerals designate corresponding parts throughout the different views.

DETAILED DESCRIPTION OF THE PRESENTLY PREFERRED EMBODIMENTS

Figure 1:
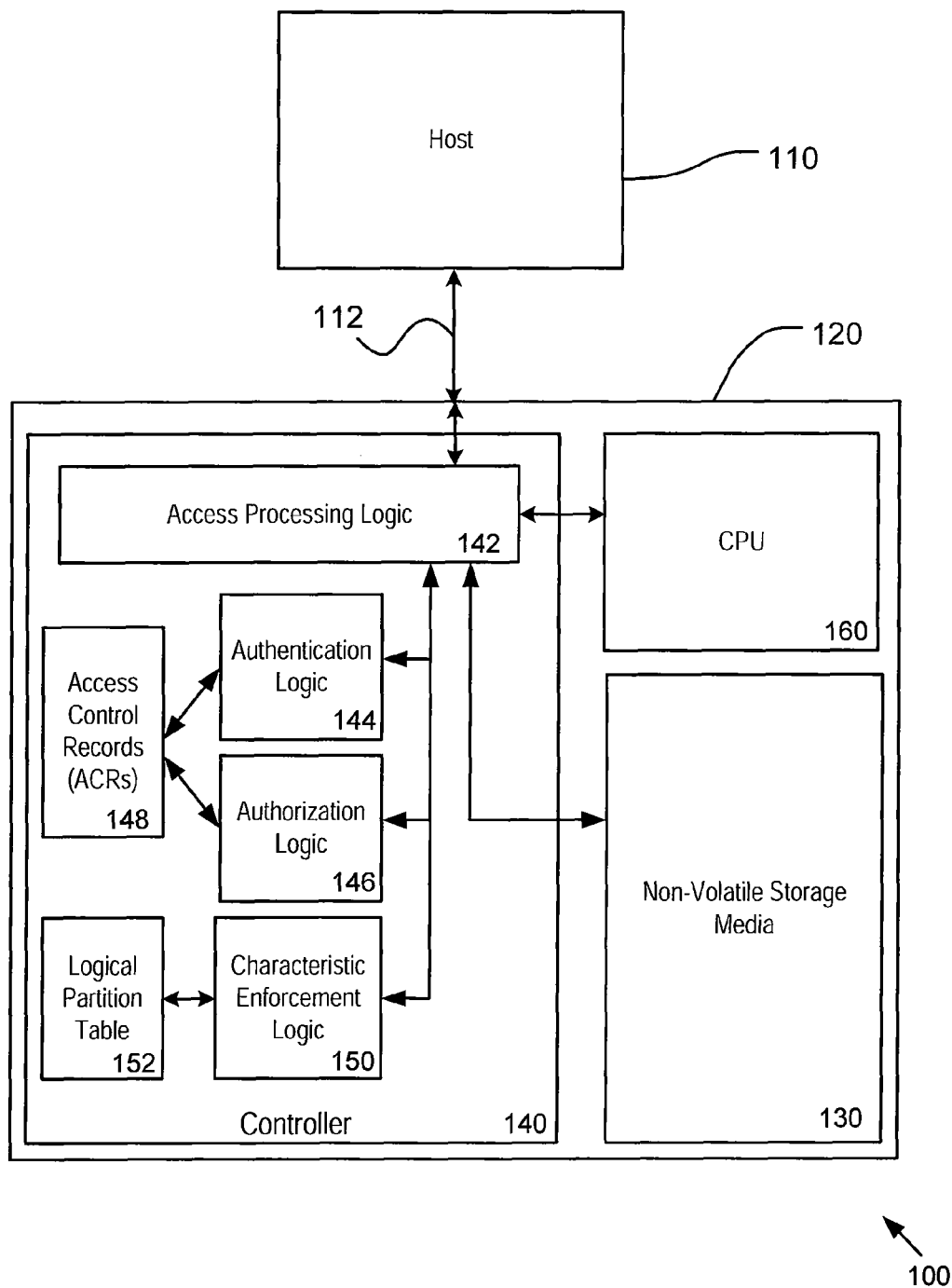
FIG. 1 is a diagram illustrating an exemplary system for accessing non-volatile storage within a non-volatile storage device.

Non-volatile storage devices may be utilized in a variety of host systems, including personal computers, notebook computers, personal digital assistants (PDAs), various data communication devices, digital cameras, cellular telephones, portable audio players, automobile sound systems, and similar types of equipment. New host applications are continually being developed to take advantage of the increasing storage capacity of non-volatile storage devices. For example, individual host applications may read or write MP3 audio files, high-resolution images files, video files, documents, Multimedia Messaging Service (MMS) object attachments, e-mail messages, address books, and calendars.

More than one application may be executing on a host at a time, and thus, two or more host applications may need to share access to a non-volatile storage device. Even in systems where only one application is executing at a time, there may be a need to limit access to data stored on a non-volatile storage device. In one example, an application may only read its own data from the non-volatile storage device. In yet another example, two users may execute the same application, but one user's data should be inaccessible to another user executing the same application. In another example, a user could choose to share data with another user. Similarly, one application may create data that another application may use. In these cases, however, it may be desirable to allow an application or user to read data created by another application or user, but prohibit modification, writing, overwriting, or erasing data created by another application or user.

The foregoing examples are a small sample of the variety of interactions that may occur when multiple applications and users share the storage space within one non-volatile storage device. Therefore, it is desirable to provide a memory system with control features that can better manage access to the storage within a non-volatile storage device.

In one embodiment, users or applications may read, write, modify, or erase data within defined address ranges within a non-volatile storage device. Each address range, or logical partition, may be associated with characteristics sets. A characteristic set may be applied when a request is received to read, write, erase, or modify data with the associated address range. Some characteristics in a set may include functionality such as encryption and decryption of stored data, power consumption when performing the access, bandwidth consumption when performing the access, and access permissions such as read, write, modify, and erase permissions. One or more address ranges, each with its own characteristic set, may be defined. In this way, one or more entities may create customized storage regions within a non-volatile storage device. When an access request is received that is outside any of the defined address ranges, a default characteristic set may be applied in processing the request.

In one embodiment, an address range may be associated with two characteristic sets. A first characteristic set is applied to a request when an entity, such as a user, host, or application, is currently authenticated and authorized to access the address range, and a second, different characteristic set is applied if no entity is currently authenticated and authorized to access the address range. In situations where the first characteristic set is applied, the entity requesting access to the address range can be one of the entities that is currently authenticated and authorized to access the address range. Alternatively, the entity requesting access is not one of the entities that is currently authenticated and authorized to access the address range. In this case, a first entity may authenticate itself to and be authorized to access an address range. Once this is completed, the first characteristic set may be applied when a second entity attempts to access the address range, even though the second entity may not have completed the authentication and authorization process. In this respect, the second entity relies on the authentication previously completed by the first entity, and enjoys the attributes specified by the first characteristic set when performing an access to that address range. In one embodiment, the identity of the entity requesting access is not available to or not used by the non-volatile storage device when processing the request. In this implementation, the determination of which characteristic set to apply is dependent on the currently-authenticated entities authorized to access the address range and is independent of the identity of the entity requesting access to the address range.

This use of characteristic sets presents several important security and performance advantages. For example, the first characteristic set associated with an address range may allow read and write access to that address range, while the second characteristic set may prohibit both read and write access. One application may be entrusted with the credentials and required procedures to authenticate itself to the address range, and to become authorized to access the address range. Once the authentication and authorization process is completed, the first characteristic set is applied to other applications attempting to access that address range. These other applications, however, do not need to be entrusted with the credentials and the authentication procedures. The security of the system may be improved because the number of entities that need to have knowledge of the credential and authentication procedure has been reduced. Further, the other applications may avoid repeating the authentication procedure in order to gain access, which may reduce the latency in accessing the address range. Thus, in this example, one application may act as a gatekeeper to enable other applications to have read and write access to an address range. As long as the application is currently authenticated to and authorized to access the address range, other applications may access that address range without having to perform a secure, time consuming, or cumbersome authentication and authorization process.

FIG. 1 is a diagram illustrating an exemplary system 100 for accessing non-volatile storage within a non-volatile storage device. The system 100 includes a host 110 and a non-volatile storage device 120. The host 110 and the non-volatile storage device 120 may be implemented in hardware, software, or a combination of hardware and software. In one embodiment, the non-volatile storage device 120 is a TrustedFlash™ card, a storage device from SanDisk Corporation of Milpitas, Calif. The host 110 and the non-volatile storage device 120 may be in communication over a communication interface 112. The communication interface may be a Universal Serial Bus (USB) interface, a Secure Digital (SD) interface, or any communication interface or protocol or combination of protocols capable of exchanging commands and data between the host 110 and a non-volatile storage device 120. For example, the host 110 may transmit data and a command over the communication interface 112 to store the data in the non-volatile storage device 120. In another example, the host 110 may transmit a command over the communication interface 112 to read data from the non-volatile storage device 120, and the non-volatile storage device 120 may return data to the host 110 over the communication interface 112. Other file operations that may be transmitted over the communication interface 112 include opening, closing, creating, extending, and erasing a file.

The host 110 may comprise one or more applications that may store or access data in the non-volatile storage device 120. In another embodiment, one or more users may store or access data in the non-volatile storage device 120 using one or more applications. Further, applications running on a processor 160 within the non-volatile storage device 120 may store or access data therein. From the perspective of the non-volatile storage device 120, some or all of these access attempts may appear as coming from two or more separate entities.

The non-volatile storage device 120 may comprise non-volatile storage media 130, a controller 140, and a CPU or processor 160. The non-volatile storage media 130 may store data, such as data received from a host 110 over a communication interface 112, data received from the processor 160, or data programmed or written to the non-volatile storage device 120 during the manufacturing process. The non-volatile storage media 130 may be a flash memory, electrically erasable programmable read-only memory (EEPROM), read-only memory (ROM), hard disk, optical disk, or any other type of memory capable of storing information and retaining that information when a power source is not applied.

The controller 140 includes an access processing logic block 142, an authentication logic block 144, an authorization logic block 146, one or more access control records (ACRs) 148, a characteristic enforcement logic block 150, and a logical partition table 152. The controller 140 and all of its components may be implemented in hardware, such as circuitry suitable to implement the functionality as described below, software, or a combination of hardware and software. In one embodiment, the controller 140 is implemented as software or firmware executed on a CPU or processor within the non-volatile storage device 120, such as the processor 160.

The controller 140 receives requests from the host 110 over the communication interface 112. The received requests may include requests to read, write, erase, or modify data in the non-volatile storage media 130. The received request may include an address, or the address may be inferred or calculated based on a previously received request. In one embodiment, the address is a logical block address (LBA), which may be remapped by the controller 140 to a physical storage location in the non-volatile storage media 130. The access processing logic block 142 determines if the address for the request is within one or more address ranges, or logical partitions, of the non-volatile storage media 130. The determination may be performed with the assistance of the characteristic enforcement logic block 150, which may review the entries in the logical partition table 152 to determine if the address for the request is within the address range of any of the logical partitions in the table. If not, a default characteristic is retrieved from the characteristic enforcement logic block 150, and returned to the access processing logic block 142. The access processing logic block 142 then applies the default characteristic or characteristic set when processing the accesses request to the non-volatile storage media 130.

If the address for the request is within the address range of any of the logical partitions in the logical partition table 152, it is determined if any entity has been authenticated, and if so, if the authenticated entity is authorized to access the address range or logical partition requested. In one embodiment, the access processing logic block 142 may retrieve a list of authenticated entities from the authentication logic block 144. The list may indicate the entities that have successfully completed an authentication process through the authentication logic block 144, such as providing a password, completing a challenge-response algorithm, or any other procedure suitable for verifying the identity of an entity seeking access to the non-volatile storage 130. An authenticated entity may "log in" to the system by completing an authentication process. Similarly, an authenticated entity may "log out" of the system by indicating to the authentication logic 144 that access is no longer desired. Thus, in another embodiment, the list of authenticated entities may include entities that are currently authenticated, in other words, entities that have "logged in" and have not yet "logged out." In one embodiment, when processing an access request, the list may be consulted to determine if a "logged in" authenticated entity is authorized to access the logical partition at the time the access request is being processed.

The access control record 148 corresponding to each authenticated entity or currently authenticated entity is reviewed by the authorization logic block 146 to determine whether the authenticated entity is authorized to access the address ranges or logical partitions corresponding to the access request to the non-volatile storage 130. If so, a first characteristic or characteristic set is retrieved by the characteristic enforcement logic block 150, and returned to the access processing logic block 142. If not, a second characteristic or characteristic set is retrieved by the characteristic enforcement logic block 150, and returned to the access processing logic block 142. The access processing logic block 142 receives the characteristic or characteristic set and applies it when processing the access request to the non-volatile storage media 130. In one embodiment, the first characteristic and the second characteristic are stored in the logical partition table 152.

The controller 140 may also receive requests from an entity to create, update, and delete logical partitions and their associated characteristics or characteristic sets. The access processing logic block 142 may determine, with the aid of the authentication logic block 144 and the access control records 148, whether an entity is authenticated. If an entity is authenticated, the access control record 148 corresponding to the authenticated entity is reviewed by the authorization logic block 146 to determine whether the authenticated entity is authorized to create a new logical partition, or update/delete an existing logical partition. The request is then processed (including allowing or denying the request) by the access processing logic block 142 according to the authorization retrieved from the access control record 148.

The controller 140 may also receive requests from an entity to add, delete, or update one or more access control records (ACRs) 148. The access processing logic 142, may determine, with the aid of the authentication logic block 144 and the access control records 148, whether an entity is authenticated. The request is then processed by the access processing logic block 142 according the authorization retrieved from the access control record 148 by the authorization logic 146.

Further details of the operation of embodiments of the system 100 will become evident through the following description and accompanying figures.

In one embodiment, a secure storage application (SSA) in the non-volatile storage device 120 provides data security, integrity and access control for data stored in the non-volatile storage device 120. The data can include files that would otherwise be stored plainly (without encryption or access control) on a mass-storage device of some kind. The SSA system sits atop of the storage system and adds the security layer for files and data stored in the non-volatile storage 130. The SSA may be implemented in hardware, software, or a combination of hardware and software, within the controller 140 and/or the processor 160.

The operation of a logical partition may be better understood in the context of an exemplary architecture that may utilize a logical partition. In one embodiment, the non-volatile storage media 130 is a NAND flash chip divided to independent physical partitions, although other types of non-volatile storage may also be utilized in alternate embodiments. These physical partitions are continuous threads of logical addresses, where a start and an end address define their boundaries. In one embodiment, each physical partition has a partition name. In this embodiment, the physical partition name and a logical block address are the addressing mechanisms used by commands that access physical storage locations in the non-volatile storage media 130. The non-volatile storage device 120 may manage the mapping of a partition name and a logical block addresses to a physical storage location within the non-volatile storage media 130. Using certain SSA commands, the host 110 can change the access attributes and size of a specific physical partition. However, the sum of sizes of all physical partitions remains constant.

A physical partition may be a public physical partition or a private physical partition. A public physical partition may be detected by any entity that can access the non-volatile storage media 130 of the non-volatile storage device 120. Stated another way, a public physical partition may be accessible without prior authentication. On the other hand, only authenticated entities may have access to and be aware of private or hidden physical partitions. Even if a private or hidden physical partition may be detected, restrictions may be imposed on access to private or hidden physical partitions, if desired, by means of hardware and/or software (such as the controller 140) that associates such restrictions with the addresses within such boundaries.

Physical partitions are fully recognizable to the SSA by their names and/or logical address boundaries that are managed by it. The SSA system uses private physical partitions to physically secure data from unauthorized host applications. To the host 110, the physical partitions are a mechanism of defining proprietary spaces in which to store data files. As indicated above, these physical partitions can either be public, where anyone with access to the storage device can see and be aware of the partition's presence on the device, or private or hidden, where only the selected host applications have access to and are aware of their presence in the storage device. One or more logical partitions or address ranges may be defined within a public physical partition or a private physical partition. A logical partition may allow the host 110 further granularity in defining security, access, and performance characteristics associated with a contiguous range of storage addresses in the non-volatile storage media 130 of the non-volatile storage device 120.

Figure 2:
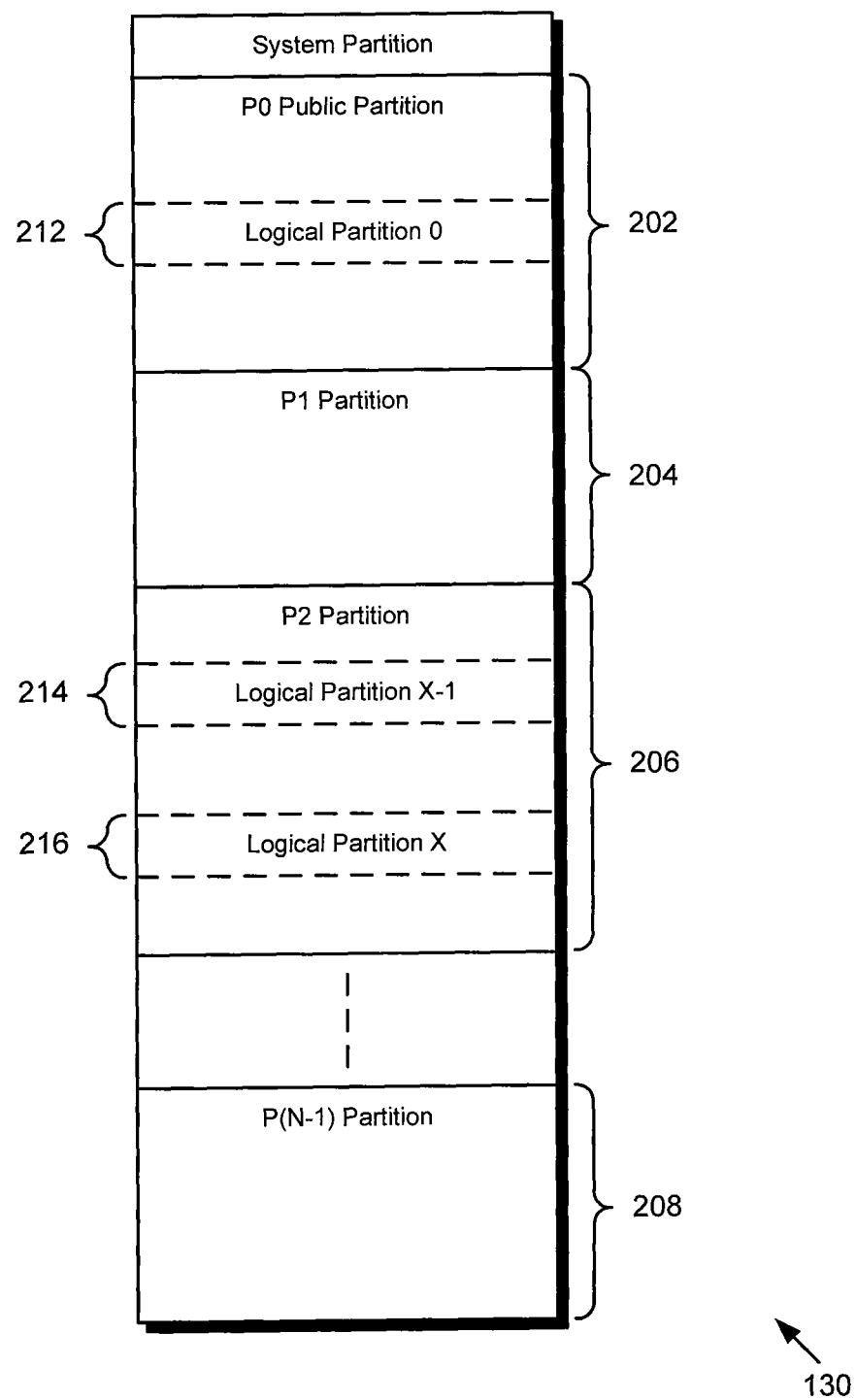
FIG. 2 is a diagram illustrating exemplary partitioning of non-volatile storage media into physical and logical partitions.

FIG. 2 is a diagram illustrating exemplary partitioning of non-volatile storage media, such as the non-volatile storage media 130 in FIG. 1, into physical and logical partitions. The non-volatile storage media 130 may be divided into a plurality of physical partitions 202, 204, 206, 208. In the embodiment shown in FIG. 2, N physical partitions are shown, but any number of physical partitions is possible. The physical partitions may be public physical partitions, or private physical partitions.

A private physical partition, such as the P1 partition 204, P2 partition 206, or P(N−1) partition 208, hides the access to the files within it. By preventing the host 110 from accessing the private physical partition, the non-volatile storage device 120 protects the data files inside the physical partition. This kind of protection, however, engulfs all of the files residing in the private physical partition by imposing restrictions on access to data stored at the logical addresses within the physical partition. In other words, the restrictions are associated with the entire private physical partition. All of the applications, users, or hosts that have access to that private physical partition will have unlimited access to all of the files within the private physical partition. Authenticated entities may access a private physical partition if authorized to do so.

In contrast, a public partition, such as P0 partition 202, can typically be accessed by any entity without authentication or authorization. Therefore, a public partition may be accessible by standard host read/write commands, or through specialized read/write commands available to authenticated entities through the SSA system. Accessing files using SSA commands allows the additional option of file-based access control through encryption, as described above. Specifically, SSA commands may be utilized to encrypt and write files to the public partition, and read and decrypt files stored in the public partition.

In order to isolate different files or groups of files from one another within a physical partition, file-level security is provided using encryption keys and key references, or key IDs. A key reference or key ID of a particular key value used for encrypting data at different memory addresses can be analogized to a container or domain within the private physical partition that contains the encrypted data or files. Even if an application, a user, or a host has access to a private physical partition containing a file encrypted with a key, the file may not be decrypted unless the application, user, or host has access to that key. Without access to the key, the application, user, or host may overwrite or corrupt encrypted files, but may not decrypt the encrypted files. Therefore, a plurality of keys may be utilized to encrypt a plurality of corresponding files within a private physical partition, thus protecting the file data from an application, a user, or a host that has access to the private physical partition, but that does not have access to the required decryption key or keys. Logical partitions defined within a public physical partition or private physical partition may also isolate or differentiate different files or groups of files from one another within a physical partition. In one embodiment, a logical partition 212 may be created to further provide for data security, integrity, and access control for data stored within the logical partition of a public partition 202 of the non-volatile storage 130. Specifically, when an access is requested within a range of addresses that define a logical partition 212 within the public partition 202, the controller 130 may apply a first characteristic set or a second characteristic set when processing the access, where these first and second characteristic sets may differ from the default characteristic set. A plurality of logical partitions 212, 214, 216 may be defined within the non-volatile storage media 130. Two or more logical partitions 214, 216 may be defined within a single physical partition 206. Further, a logical partition 216 may be defined within a private physical partition 206, such as the private physical partition 216. Information about logical partitions defined in the non-volatile storage device 120 may be stored in the logical partition table 152.

When an entity requests access to regions of the public partition 202 or the private partitions 204, 206, and 208 that are not within one of the defined logical partitions 212, 214, 216, the controller 140 may apply a default set of characteristics in responding to the access request. The default characteristics may be applied to control functionality such as encryption, power consumption, bandwidth consumption, and access permissions.

Thus, an exemplary non-volatile storage device 120 may control access to data stored in the non-volatile storage media 130 using any combination of the protection schemes disclosed herein. The host 110 may chose to utilize physical protection by storing the file in a private physical partition accessible only to authenticated entities. The host 110 may store a file within a logical partition defined within a physical partition, where encryption, power consumption, bandwidth consumption, and access permissions are applied when accessing files stored within the logical partition. Access to an individual file stored anywhere within the non-volatile storage media 130 may be effectively prohibited by encrypting the file with a key only accessible to one or more authenticated entities. Any combination of these protection schemes may be used to manage access to data stored in the non-volatile storage device 120. The details of each content protection scheme will be discussed in further detail below.

Figure 3:
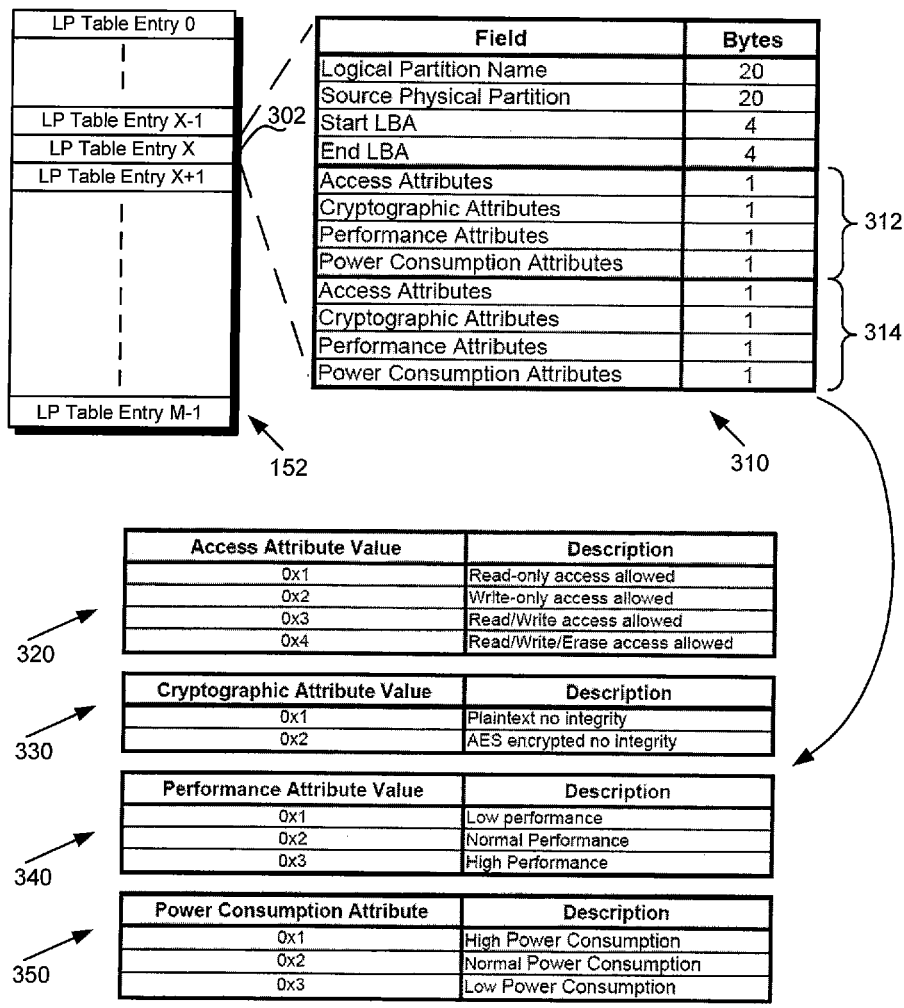
FIG. 3 is a diagram illustrating an exemplary logical partition table, entries therein, and encodings of various characteristics applied during access to a non-volatile storage device.

As stated above, information about logical partitions defined in the non-volatile storage device 120 may be stored in the logical partition table 152. FIG. 3 is a diagram illustrating an exemplary logical partition table 152, entries therein, and encodings of various characteristics applied during access to the non-volatile storage device 120. In one embodiment, the logical partition table 152 comprises M entries, where M is equal to the number of logical partitions. In another embodiment, the logical partition table also contains an additional entry to store a default characteristic set applied to access requests for addresses outside of any of the defined logical partitions.

Each entry in the logical partition table 152 corresponds to a logical partition within the non-volatile storage media 130, as illustrated in FIG. 2. For example, the logic partition 216 in FIG. 2 has a corresponding logic partition table entry 302 in the logical partition table 152. An entry in the logical partition table 152, such as the logical partition table entry 302, contains information such as the logical partition name or identifier, an identifier for the source physical partition in which the logical partition is defined, and the starting and ending logical block address (LBA) of the logical partition. Additionally, the logical partition table entry 302 contains two sets of characteristics 312 and 314. In the example shown in FIG. 3, each of the two sets of characteristics 312 and 314 may specify access attribute characteristics, cryptographic attribute characteristics, performance attribute characteristics, and power access attribute characteristics. The first characteristic set 312 may be retrieved from the table and used to process an access request within the logical partition 216 when an entity is currently authenticated and authorized to access the logical partition 216. The second characteristic set 312 may be retrieved from the table and used to process an access request within the logical partition 216 when no entity is currently authenticated and authorized to access the logical partition 216.

Within the broad categories of access attribute characteristics, cryptographic attribute characteristics, performance attribute characteristics, and power consumption characteristics, many characteristic settings are possible. For example, as shown in the Table 320, access attribute characteristics may include inhibiting write access, inhibiting read access, or inhibiting the erasure of data within the logical partition. In another embodiment, the access attribute characteristics may inhibit or allow the use of standard host read/write/erase commands to access a logical partition, such as the logical partition 212 in the public physical partition 202. As shown in exemplary Table 330, cryptographic attribute characteristic values may require selected encryption algorithms to be utilized when writing data to or reading data from a logical partition.

The Table 340 demonstrates exemplary performance attribute values. In one embodiment, selection of high, normal, or low performance may allow the controller 140 applying the characteristic to prioritize higher performance requests, to interrupt other non-volatile storage accesses, or to take other actions to improve the latency or data bandwidth of an access request. Similarly, when the controller 140 applies a low performance characteristic, the controller 140 may allow other processes or accesses to take priority over the requested access. Other performance encoding schemes are also possible. In one embodiment, the performance attribute characteristic value may indicate a data bandwidth quantity or latency quantity characteristic that the controller 140 applies when processing requests to a particular logical partition.

As shown in the Table 350, exemplary power consumption characteristics may specify a high, normal, or low power consumption value. In one embodiment, the controller 140 may apply a low power characteristic by disabling or slowing down at least some clock trees within the non-volatile storage device 120 in order to reduce power consumption when processing requests to a particular logical partition. Other power consumption characteristics may be encoded in the logical partition table entry 302 and applied by the controller 140.

The characteristic categories and the encodings described herein are exemplary and are not meant to be limiting. Any characteristic that may control, restrict, or impose requirements or limitations on permissions, encryption, performance, power consumption, or any other attribute related to accessing a non-volatile storage may be encoded in a characteristic and applied by the controller 140 in response to an access request.

By having a first set of characteristics 312 and a second set of characteristics 314 associated with a logical partition, it may be possible to create several useful data security, integrity, and access control configurations for the logical partition. For example, an access attribute characteristic within the first set of characteristics may allow for read and write access, while another access attribute characteristic within the second set of characteristics may allow for read access and not write access. Thus, when an entity is currently authenticated and authorized to access a logical partition, read and write access to the logical partition may be allowed. When no entity is currently authenticated and authorized to access a logical partition, the logical partition may be read from, but not written to. In another example, when an entity is currently authenticated and authorized to access the logical partition, a high performance access characteristic may be applied to requests to access a partition. When an entity is not currently authenticated and authorized to access the logical partition, a low performance access characteristic may be applied. Many other useful combinations for data security, integrity, and access control configurations are possible.

As stated above, in order to determine whether a characteristic from the first set of characteristics 312 or the second set of characteristics 314 is applied in responding to an access request to a logical partition, the controller 140 determines whether a currently-authenticated entity is authorized to access the logical partition. Logging in to the SSA system through an Access Control Record (ACR) is necessary to create, update, or delete a logical partition, to allow a first set of characteristics to be applied when the logical partition is accessed. An entity that calls for the ability to create keys and physical partitions, as well as writing and reading data from them or using the keys, also needs to log in to the SSA system through an ACR.

The privileges of an ACR in the SSA system are called Actions. Every ACR may have Authorizations to perform Actions of the following categories: creating logical partitions, physical partitions, and keys/key IDs, accessing physical partitions and keys, enabling the application of a first characteristic set when accessing a logical partition, and creating/updating other ACRs. ACRs are organized in groups called ACR Groups or AGPs. Once an ACR has successfully authenticated, the SSA system opens a Session through which any of the Actions of an ACR can be executed.

Figure 4:
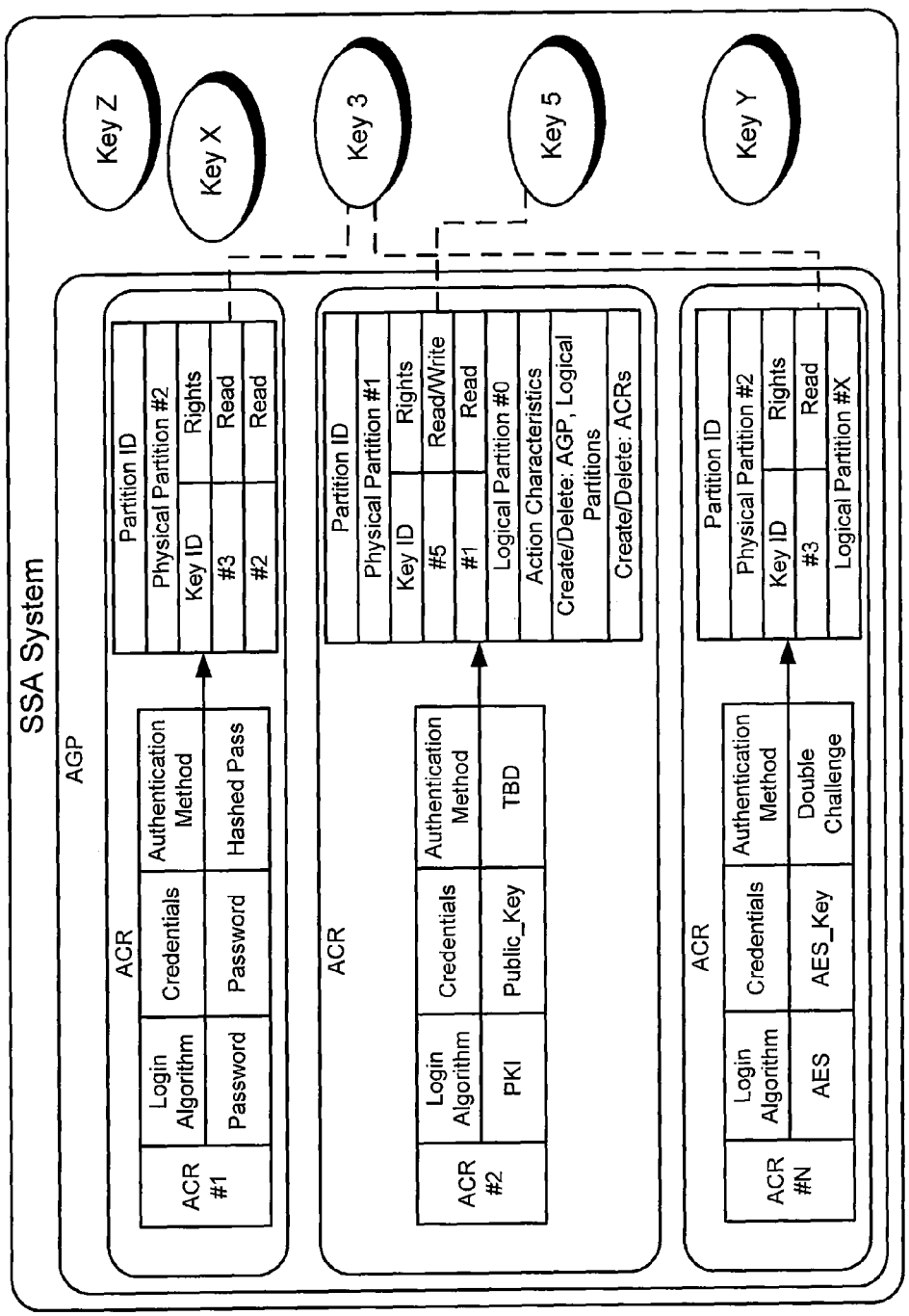
FIG. 4 is a diagram illustrating exemplary access control records (ACRs), including authentication and authorization information, within an access control group (AGP).

FIG. 4 is a diagram illustrating exemplary access control records (ACRs), including authentication and authorization information, within an access control group (AGP). The ACR is an individual "log in" point to the SSA system. The ACR holds the "log in" or authentication credentials and the authentication method. Also residing in the ACR is the Permission Control Record (PCR), the permissions or authorizations within the SSA system, among which are the read and write privileges. This is illustrated in FIG. 4, which illustrates N ACRs in the same AGP. Because the ACRs are within the same AGP, at least some of the N ACRs may share access to the same key. Thus, ACR #1 and ACR #N share access to a key with key ID "key3", where ACR #1 and ACR #N are the ACR IDs, and "key 3" is a key ID for the key that is used to encrypt data associated with "key 3." The same key can also be used to encrypt and/or decrypt multiple files, or multiple sets of data.

In order to log into or become authenticated to an ACR, an entity needs to specify the ACR ID so that the SSA will set up the correct "log in" or authentication algorithms, and select the correct PCR when all "log in" or authentication requirements have been met. The ACR ID is provided to the SSA system when the ACR is created. The SSA system supports several types of "log in" onto the system where authentication algorithms and entity credentials may vary, as the entity's privileges or authorizations in the system once the entity is logged in or authenticated successfully. FIG. 4 again illustrates different "log in" algorithms and credentials. ACR #1 requires a password "log in" algorithm and password as credential whereas ACR #2 requires a PKI (public key infrastructure) "log in" algorithm and public key as credential. Thus, to log in, or be authenticated, an entity will need to present a valid ACR ID and credential, as well as complete the correct authentication or log in algorithm. The authentication algorithm specifies what sort of "log in" procedure will be used by the entity, and what kind of credential is needed to provide proof of the user's identity. The SSA system supports several standard "log in" algorithms, ranging from no procedure (and no credential) and password-based procedures to a two-way authentication protocols based on either symmetric or asymmetric cryptography.

The entity's credentials correspond to the "log in" algorithm and are used by the SSA to verify and authenticate the entity. An example for credential can be a password/PIN-number for password authentication, AES-key for AES authentication, etc. The type/format of the credentials (i.e., the PIN, the symmetric key, etc.) is predefined and derived from the authentication mode; they are provided to the SSA system when the ACR is created. In this embodiment, the SSA system has no part in defining, distributing and managing these credentials, with the exception of PKI based authentication where the storage device 120 can be used to generate the RSA key pair and the public key can be exported for certificate generation.

An ACR may have a blocking counter which increments when the entity's ACR authentication process with the system is unsuccessful. When a certain maximum number of unsuccessful authentications is reached, the ACR can be blocked by the SSA system, and no further authentication attempts to that ACR will succeed.

Once an entity is logged into an ACR of the SSA system, its permissions—its rights to use SSA commands—are defined in the Permissions Control Record (PCR) which is associated with the ACR. Stated another way, the PCR indicates the SSA commands and keys that a successfully-authenticated entity is authorized to use, and the physical and logical partitions that an entity is authorized to access and create, and the ACR and AGP management actions that an entity is allowed to take.

This partition list section of the PCR contains the list of partitions (using their IDs as provided to the SSA system) that the entity is authorized to access upon completing the ACR phase successfully. Thus, ACR #1 in FIG. 4 has access to physical partition #2 and not physical partition #1. As shown in FIG. 4, an entity authenticated to ACR #2 is authorized to access logical partition #0, and an entity authenticated to ACR #N is authorized to access logical partition #X. While the PCR of an ACR may establish, for example, that an entity authenticated to ACR #N is authorized to access logical partition #X, the characteristic set associated with logical partition set may be utilized to determine the particular access types permitted. Referring back to FIG. 3, a logical partition table entry corresponding to logical partition #X may contain access attributes as part of the first characteristic set 312 and the second characteristic set 314.

For example, assume that the access attribute in the first characteristic set for logical partition #X is 0x4, and thus read/write/erase access in the logical partition is permitted. Additionally, assume that the access attribute in the second characteristic set for logical partition #X is 0x1, which means that read-only access in the logical partition is allowed. When a request is received to write to an addressable memory location within logical partition #X, the controller 140 may determine if an entity is authenticated to ACR #N (and any other ACR with a PCR authorizing access to logical partition #X). In one embodiment, the identity of the access requestor is known but not used by the controller 140 when determining which logical partition characteristic set to apply when processing the access request. In another embodiment, the identity of the requestor is not known to the controller 140. In either case, the identity of the requestor is not necessary to determine which logical partition characteristic set to apply when processing the request. Referring briefly to FIG. 3, the PCR of ACR #N authorizes access to logical partition #X. Thus, if any entity is authenticated to ACR #N at the time that the request is being processed, then the characteristics from the first characteristic set associated with logical partition #X will be applied in processing the request, and the write request will be granted. If no entities are authenticated to ACR #N (or any other ACR with a PCR authorizing access to logical partition #X) at the time that the request is being processed by the controller 140, then the second characteristic set associated with logical partition #X set will be applied, and the write request will be denied.

The key ID section of the PCR contains the data associated with the list of key IDs (as provided to the SSA system by the host 110) that the entity can access when the ACR policies have been met by the entity's "log in" process. The key ID specified is associated with one or more files that reside in the partition appearing in the PCR. Since the key IDs are not associated with logical addresses in the storage device, when more than one partition is associated with a specific ACR, the files can be in either one of the partitions. The key IDs specified in the PCR can each have a different set of access rights. Accessing data pointed to by key IDs can be restricted to write-only or read only or may specify full write/read access rights.

The ACR attributes management section (ACAM) of the ACR describes management actions that an entity authenticated to that ACR is authorized to perform. Actions that may be permitted in the SSA system include creating, deleting, or updating AGPs and ACRs, creating or deleting logical partitions, physical partitions, or keys, and delegating access rights to keys and partitions. An entity should preferably be authenticated to an ACR in order to change these ACAM permissions defined by that ACR. Deletion of the ACR, and recreation of the ACR with changed ACAM permissions, is preferable to simply changing the ACAM permissions of an existing ACR. The access permission to a key ID created by the ACR can preferably not be taken away. An ACR may have the capacity to create other ACRs and AGPs. Creating ACRs also may mean delegating to them some or all of the ACAM permissions possessed by their creator. In this embodiment, having the permission to create ACRs means having the permission for the following actions:

1. Define and edit the created ACR's (child's) credentials—the authentication method preferably cannot be edited once set by the creating ACR. The credentials may be altered within the boundary of the authentication algorithm that is already defined for the child.

2. Delete an ACR.

3. Delegate the creating permission to the child ACR (thus having grandchildren).

The father ACR is preferably the only ACR that has the permission to delete its child ACR. When an ACR deletes a lower level ACR that it created, then all ACRs spawned by this lower level ACR are automatically deleted as well. When an ACR is deleted, all the key IDs and partitions that it created are deleted. There are two exceptions by which an ACR can update its own record. First, while the creator ACR establishes a password or PIN for an ACR, only the ACR itself can update its own the password or PIN. Second, a root ACR may delete itself and the AGP that it resides in.

As mentioned above, an ACR may have a blocking counter which increments when the entity's ACR authentication process with the system is unsuccessful. When a certain maximum number of unsuccessful authentications is reached, the ACR will be blocked by the SSA system. An unblocking permission may also be defined to allow the unblocking of an ACR that has been blocked. An ACR with the permissions to create other ACRs has the permission to delegate the unblocking permission to ACRs it creates (although it preferably does not have the permission to unblock ACRs). The father ACR will place in the child ACR a reference to the unblocker of the father ACR. The blocked ACR can be unblocked by another ACR, referenced by the blocked ACR. The reference to the unblocking ACR is set by its creator. The unblocking ACR preferably is in the same AGP as the creator of the blocked ACR and has the "unblocking" permission. No other ACR in the system can unblock the blocked ACR. An ACR may be configured with a blocking counter but without an unblocker ACR. In this case, if this ACR get blocked it cannot be unblocked.

The permission to create keys preferably includes the permission to delegate access permissions to use the keys. Permissions to keys are divided into three categories.

1. Access—this defines the access permissions for the key, such as permitting read or write operations using the key to decrypt or encrypt data, respectively.

2. Ownership—an ACR that created a key is by definition its owner. This ownership can be delegated from one ACR to another (provided that they are in the same AGP or in a child AGP). An ownership of a key provides the permission to delete it as well as delegate permissions to it.

3. Access Rights/Delegation—this permission enables the ACR to delegate the rights held by the ACR.

An ACR can delegate access permissions to logical or physical partitions created by that ACR, as well as logical or physical partitions that the ACR has access permissions to. The permission delegation is done by adding the names of the logical partitions, physical partitions, and key IDs to the designated ACR's PCR. Delegating key access permissions may either be by the key ID or by stating that access permission is for all of the created keys of the delegating ACR.

Thus, reviewing the PCR section of the ACRs in FIG. 4, ACR #1 grants read only permission to data in Physical Partition #2 associated with "key 3," where "key 3" may be utilized to decrypt data read from the non-volatile storage 130, and ACR #2 grants permission to read and write data in Physical Partition #1 associated with "key 5," and may utilize "key 5" to encrypt or decrypt data according to the PCR shown. As noted above, when a file is written to a certain hidden partition, such as the P1, P2, or P(N−1) partitions 204, 206, and 208 of FIG. 2, it is hidden from the general public and is only accessible through SSA commands by an authenticated and authorized entity. But, once an entity (hostile or not) gets knowledge and access to this partition, the file becomes available and plain to see. To further secure the file, the SSA can encrypt it in the hidden partition, where the credentials for accessing the key for decrypting the file are preferably different from those for accessing the partition. Due to the fact that files are not something that the SSA is aware of (because files are totally controlled and managed by the host), associating a content encryption key (CEK) with a file is a problem. Linking the file to something the SSA acknowledges—the key ID, rectifies this.

Thus, when a key is created by the SSA, the host associates the key ID for this key with the data encrypted using the key created by the SSA. The key value and key ID provide logical security. All data associated with a given key ID, regardless of its location, is ciphered with the same CEK whose reference name or key ID is uniquely provided at creation by the host application. Once an entity obtains access to a hidden partition (by authenticating through an ACR) and wishes to either read or write an encrypted file within this partition, it needs to have access to the key ID that is associated with the file. When granting access to the key for this key ID, the SSA loads the key value in the CEK associated with this key ID and either decrypts the data before sending it to the host 110 or encrypts the data before writing it to the non-volatile storage 130. A key value in the CEK associated with a key ID is randomly created once by the SSA system and maintained by it. No one outside the SSA system has knowledge or access to this key value in the CEK. The outside world only provides and uses a reference or key ID, not the key value in CEK. The key value is entirely managed and only accessible by the SSA.

In another example, in FIG. 4, an entity authenticated to ACR #2 is authorized to access Logical Partition #0, and an entity authenticated to ACR #N is authorized to access Logical Partition #X. Thus, if an entity is currently authenticated to ACR #2, when an access request to Logical Partition #0 is received, a first characteristic set 312 is applied when processing an access request. In another example, if an entity is currently authenticated to ACR #N, when an access request to logical partition #X is received, a first characteristic set 312 is applied when processing an access request.

Different ACRs may share common interests and privileges in the system such as keys with which to read and write, and logical partitions where access is authorized. To accomplish this, ACRs with something in common are grouped in AGPs, or ACR Groups. Thus, ACR #1 and ACR #N share access to a key with key ID "key 3." While not shown in FIG. 4, ACRs within an AGP can share access to a logical partition as well.

Figure 5:
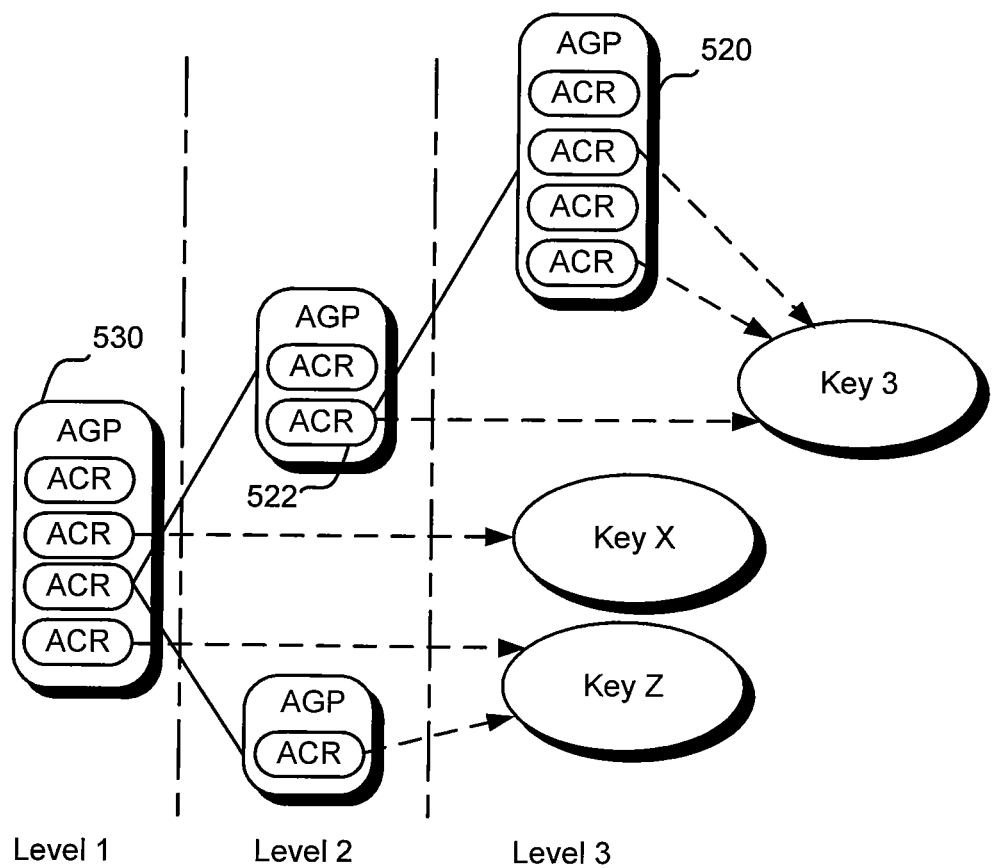
FIG. 5 is a diagram illustrating an exemplary arrangement of access control records and access control groups into a tree-like hierarchal structure.

ACRs and their AGPs may be further assembled in hierarchical trees. FIG. 5 is a diagram illustrating an exemplary arrangement of access control records and access control groups into a tree-like hierarchal structure. The root AGP and the ACRs within are at the top of the tree (e.g. root AGP 530 in FIG. 5). There can be several AGP trees in the SSA system though they are totally separated from one another. An ACR within an AGP can delegate access permissions to its keys to all ACRs within the same AGP that it is in and to all the ACRs created by that ACR.

Therefore, in addition to containing information that defines authorizations to keys, logical partitions, physical partitions, and management commands, an ACR can preferably also create other (child) ACR entries. These ACR children will have the same or less permissions as their father/creator and may be given permissions for keys and partitions that the father ACR created. The children ACRs get access permissions to any key that they create. This is illustrated in FIG. 5. Thus, all of the ACRs in AGP 520 were created by ACR 522 and two of such ACRs inherit from ACR 522 permission(s) to access to data associated with "key 3."

Logging onto the SSA system is done by specifying an AGP and an ACR within the AGP. Every AGP has a unique ID (reference name), which is used as an index to its entry in the SSA database. The AGP name is provided to the SSA system, when the AGP is created. If the provided AGP name already exists in the system, the SSA will reject the creation operation.

AGPs are used to administer restrictions on delegation of access and management permissions. While only one tree is shown in FIG. 5, more than one tree can exist within the SSA system. One of the functions served by the tree in FIG. 5 is to administer the access by an entity, such a host application or user. A separate tree may be defined for each entity. For such purposes, it may be important for the access processes to the ACRs in each tree to be substantially independent of one another (i.e., substantially no cross-talk), even though both occur at the same time. This means that the authentication, permissions as well as the creation of additional ACRs and AGPs in each tree are not connected to and do not depend on those of the other tree. Hence, when the SSA system is used in the non-volatile storage device 120, two applications to access two separate sets of data simultaneously, and independently of one another.

The tree structure of the AGP system is the main tool used to identify and isolate application specific data. The root AGP is at the tip of an application SSA database tree and adheres to somewhat different behavior rules. Several root AGPs can be configured in the SSA system. A new host application or entity in the host 110 may define its own secure data space or security configuration within the non-volatile storage device 120 through the process of adding a new AGP/ACR tree to the device.

The SSA system in this embodiment supports three different modes of root AGP creation (as well as all of the ACRs of the root AGP and their permissions):

1. Open—Any entity (such as a user or application) without requiring any sort of authentication, or entities authenticated through the system ACR (explained below), can create a new root AGP. The open mode enables creation of root AGPs either without any security measures while all data transfer is done on an open charnel (i.e. in the secure environment of an issuance agency) or, through a secure channel established through the system ACR authentication (i.e. Over The Air (OTA) and post issuance procedures). If the optional system ACR is not configured and the root AGP creation mode is set to Open, only the open channel option is available.

2. Controlled—Only entities authenticated through the system ACR can create a new root AGP. The SSA system cannot be set to this mode if system ACR is not configured.

3. Locked—Creation of root AGPs is disabled and no additional root AGPs can be added to the system Two SSA commands control this feature (these commands are available to any user/entity without authentication):

1. Method configuration command—Used to configure the SSA system to use any one of the three root AGP creation modes. Only the following mode changes are allowed: a) a change from Open to Controlled, b) a change from Controlled to Locked (i.e. if the SSA system is currently configured as Controlled, it can only be changed to locked).

2. Method configuration lock command—Used to disable the method configuration command and permanently lock the currently selected method.

When a root AGP is created, it is in a special initializing mode that enables the creation and configuration of its ACRs (using the same access restrictions that applied to the creation of the root AGP). At the end of the root AGP configuration process, when the entity explicitly switches it to operating mode, the existing ACRs can no longer be updated and additional ACRs can no longer be created.

Once a root AGP is put in standard mode it can be deleted only by logging into the system through one of its ACRs that is assigned with the permission to delete the root AGP. This is another exception of root AGP, in addition to the special initialization mode; it is preferably the only AGP that may contain an ACR with the permission to delete its own AGP, as opposed to AGPs in the next tree level. In other cases, the ACR that created the AGP has the permission to delete it only when the AGP is empty of ACR entries. Another difference between a root ACR and a standard ACR is that it is the only ACR in the system that can have the permission to create and delete physical partitions.

The controller 140 may also utilize a specialized ACR, called the system ACR, to perform the following two SSA operations:

1. Create an ACR/AGP tree under the protection of a secured channel within hostile environments.

2. Identify and authenticate the device hosting the SSA system.

There may preferably be only one system ACR in the SSA, and, once defined, it preferably can not be changed. There is no need for system authentication when creating the system ACR; only a SSA command is needed. The "create system ACR" feature can be disabled (similarly to the create-root-AGP feature). After the system ACR is created, the "create system ACR" command has no effect, since preferably only one system ACR is allowed.

While in the process of creating, the system ACR is not operational. Upon finishing, a special command preferably needs to be issued indicating that the system ACR is created and ready to be used. After this command is issued, the system ACR preferably cannot be updated or replaced.

The system ACR creates the root ACR/AGP in the SSA. It has permission to add/change the root level ACR/AGP until such time that the host is satisfied with it and blocks it. Blocking the root AGP through an SSA command essentially cuts off its connection to the system ACR and renders it tamper proof. The root AGP and the ACRs within cannot be changed or edited. Disabling creation of root AGPs has a permanent effect and cannot be reversed. The system ACR is used to create different root AGPs, such as the root AGP 530 in FIG. 5. At a certain time after these are created, another SSA command can be sent from the host to block the creation of root AGPs from the system ACR, thereby disabling the "create root AGP" feature. In doing so, the root AGPs already created are rendered tamper-proof. The root AGPs may be used to create children AGPs, before or after the root AGPs are blocked.

The above described features provide great flexibility to the content owner in configuring secure products with content. Secure products need to be "Issued." Issuance is the process of putting identification keys by which the non-volatile storage device 120 can identify the host 110 and vice versa. Identifying the non-volatile storage device 120 enables the host 110 to decide whether it can trust its secrets with it. On the other hand, identifying the host 110 enables the device 120 to enforce security policies (grant and execute a specific host command) only if the host 110 is allowed to.

Products that are designed to serve multiple applications will have several identification keys. The product can be "pre-issued"—keys stored during manufacturing before shipping, or "post issued"—new keys are added after shipping. For post issuance, the memory device (e.g. memory card) needs to contain some kind of master or device level keys, which are used to identify entities which are allowed to add applications to the device.

The above described features enable a product to be configured to enable/disable post issuance. In addition, the post issuance configuration can be securely done after shipping. The device may be bought as a retail product with no keys on it, in addition to the master or device level keys described above, and then may be configured by the new owner to either enable further post issuance applications or disable them.

Thus, the system ACR feature provides the capability to accomplish the above objectives. Memory devices with no system ACR will allow unlimited and uncontrolled addition of applications. Memory devices without a system ACR can be configured to disable the system ACR creation, which means there is no way to control adding of new applications (unless the feature of creating new root AGP is disabled as well). Memory devices with a system ACR will allow only controlled addition of applications via a secure channel to establish through an authentication procedure using the system ACR credential. Memory devices with a system ACR may be configured to disable the application adding feature, before or after applications have been added.

Figure 6:
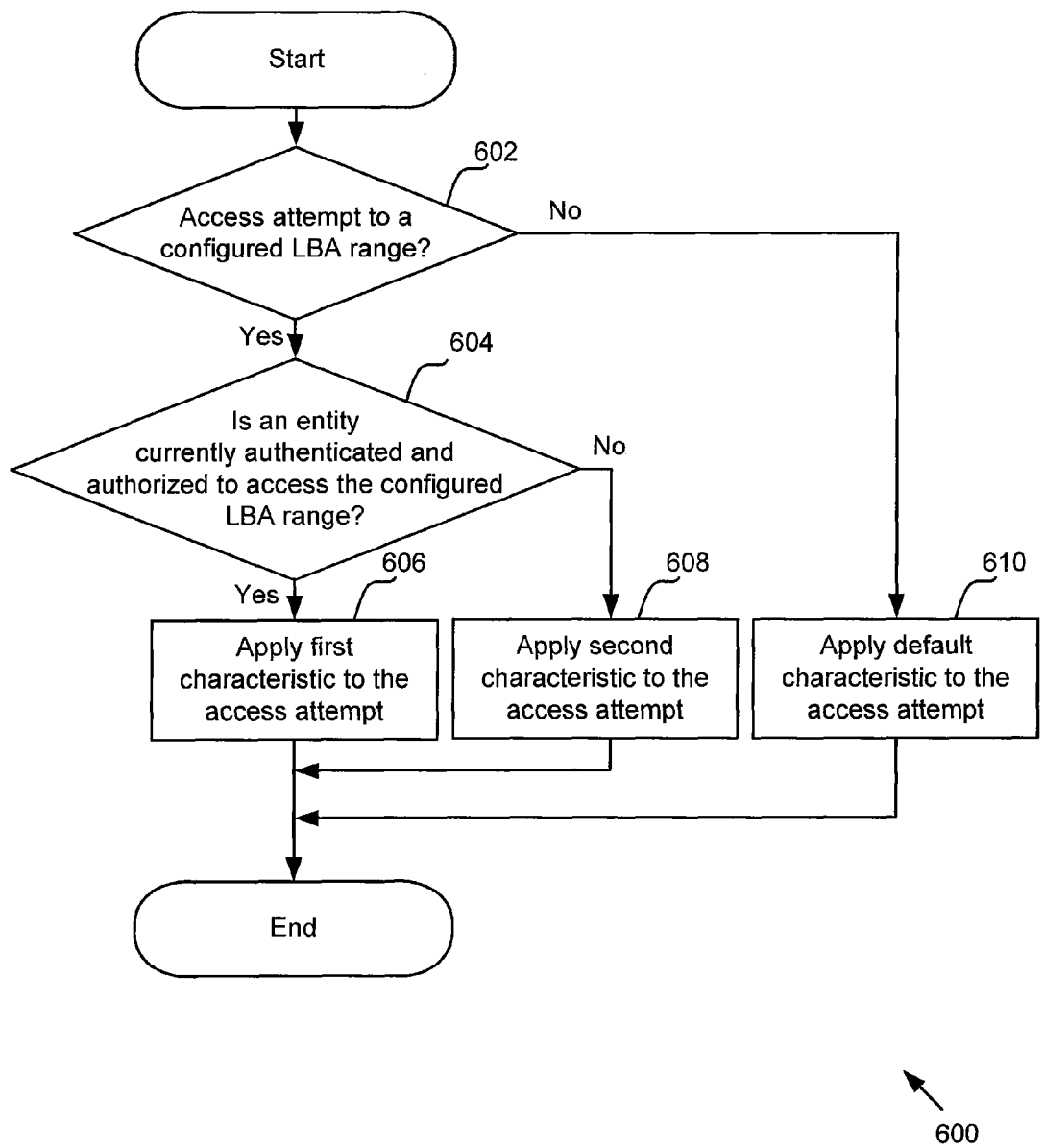
FIG. 6 shows exemplary steps for processing an access attempt to non-volatile storage within a non-volatile storage device.

The SSA system may be utilized to process requests to access, create, modify and delete configured address ranges or logical partitions. FIG. 6 shows exemplary steps 600 for processing an access attempt to non-volatile storage within a non-volatile storage device. Referring briefly to FIG. 1, a request is received to access the non-volatile storage media 130 of the non-volatile storage device 120. The request may be received from the host 110 over communication interface 112. Returning to FIG. 6, at step 602, the access processing logic block 142 of the controller 140 determines if the received request is to access (such as read, write, or erase) data in a logical partition defined within the non-volatile storage media 130. The access processing logic block 142 consults the characteristic enforcement logic block 150, and if appropriate the logical partition table 152, to determine if the address associated with the access request is within a logical partition or address range defined in the logical partition table 152. If not, control passes to step 610, and the access processing logic block 142 retrieves a default characteristic set stored in the logical partition table 152 or elsewhere with the controller 140, and applies the default characteristic or characteristic set when processing the access request.

If the address associated with the access request is within a logical partition or address range defined in the logical partition table 152, then the received request is an access with a logical partition or address range. Control then passes from step 602 to step 604. At step 604, the controller 140 determines whether a currently-authenticated entity is authorized to access the configured LBA range. The access processing logic block 142 may consult a table or list of entries within the authentication logic block 144 to determine the entities that are currently authenticated or "logged in" to the system. The access processing logic block 142 may then utilize the authorization logic block 142 to check the ACR associated with each authenticated entity to determine if any authenticated entity has an authorization to access the logical partition or address range requested.

If at least one entity is currently authenticated and authorized to access the partition, control passes to step 610, and the access processing logic block 142 uses the characteristic enforcement logic block 150 to retrieve from the logical partition table 152 a first characteristic set associated with the logical partition. The access processing logic block 142, if appropriate in conjunction with the characteristic enforcement logic block 150, applies the first characteristic or characteristic set when processing the access request. If no entities are currently authenticated, or if none of the currently-authenticated entities have authorization to access the logical partition requested in the access attempt, then control passes to step 608, where a second characteristic set is retrieved and applied when processing the access request.

In one embodiment, in step 604, the authenticated and authorized entity must be the same entity requesting access to the logical partition or address range. In another embodiment, the authenticated and authorized entity can be, but does not have to be, the entity requesting access to the logical partition or address range. In this embodiment, if a currently-authenticated entity is authorized to access the address range, any entity, including the currently-authenticated entity, may then access the logical partition. In one implementation, the secure storage application (SSA) of the non-volatile storage device 120 can determine the identity of the entity requesting access to the logical partition or address range, and does not utilize this identity information when selecting the characteristic to apply when processing the access request. In another implementation, SSA can not determine the identity of the entity requesting access to the logical partition or address range. For example, the entity requesting access may not provide identifying information as part of the access request. In this case, if a currently-authenticated entity is authorized to access the address range, any entity, regardless of the unknown identity of the entity, may then access the logical partition.

In addition to handling requests to read or write data to a logical partition or address range, the controller 140 may also process requests to manage logical partitions or configured address ranges. The management of logical partitions may include creating a logical partition, deleting a logical partition, and modifying one or more of the characteristic or characteristic sets associated with a logical partition or address range.

Figure 7:
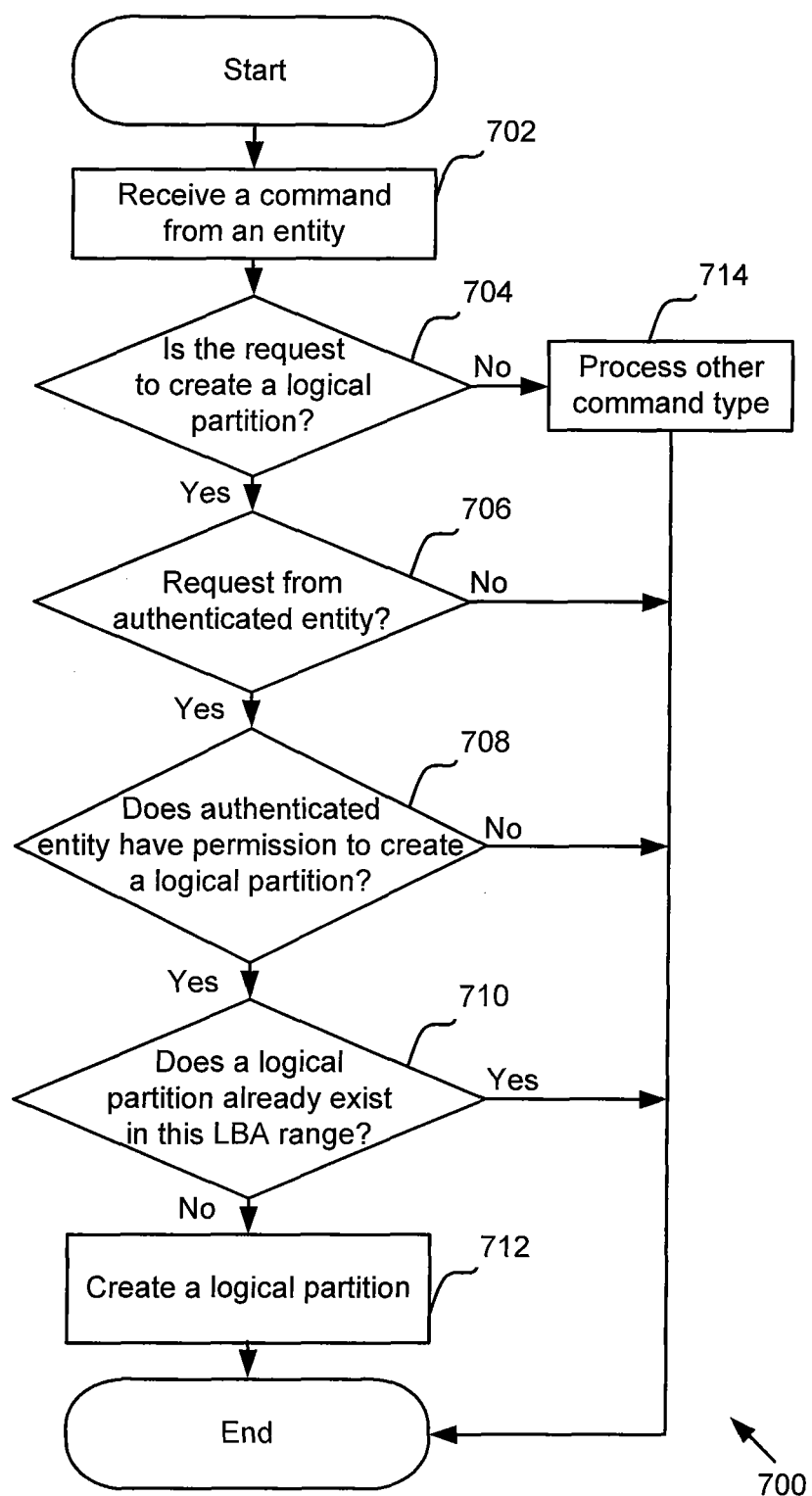
FIG. 7 shows exemplary steps for creating a logical partition in non-volatile storage within a non-volatile storage device.

FIG. 7 shows exemplary steps 700 for creating a logical partition in the non-volatile storage media 130 within the non-volatile storage device 120. Referring briefly to FIG. 1, a request is received to create a logical partition within the non-volatile storage media 130 of the non-volatile storage device 120. The request may be received from the host 110 over communication interface 112. Returning to FIG. 7, at step 702, the controller 140 receives a command from an entity. Control passes to step 704, where the controller determines if the request is to create a logical partition. If not, the controller processes the command in step 714, and the steps 700 complete. If the request is to create a logical partition, control passes to step 706, where the controller 140 determines if the request is received from an authenticated entity. In one embodiment, when an entity is authenticated to an ACR, the SSA system issues a session ID to the entity. In another embodiment, upon successful authentication, a secure channel is established between the newly authenticated entity and the controller 140. In one embodiment, a secure channel is established on the communications interface 112 between the host 110 and the non-volatile storage device 120 by encrypting data with a channel key before it is transmitted over the communication interface 112, and recovering data by decrypting data a channel key after it is received at the destination. A secure channel may protect sensitive information specified by the entity or returned by the non-volatile storage device 120 when creating the logical partition. The authenticated entity may transmit the session ID, and possibly the ACR ID, to the controller 140, possibly over a secure channel, in order to identify itself as an authenticated entity. If request to create a logical partition does not come from an authenticated entity, the steps 700 terminate, and a logical partition is not created.

If the entity is currently authenticated, control passes from step 706 to step 708. In step 708, the controller 140 determines if the authenticated entity has permission to create a logical partition. The access processing logic block 142 utilizes the authorization logic block 146 to check the ACR associated with the authenticated entity. For example, referring to FIG. 4, the PCR of ACR #2 indicates that an entity authenticated using ACR #2 is authorized to create a logical partition. In comparison, the PCRs of ACR #1 and ACR #N do not authorize an authenticated entity to create a logical partition. If the entity is not authorized to create a logical partition, the steps 700 terminate, and a logical partition is not created.

If the authenticated entity is authorized, control passes to step 710, where the controller 140 checks the address range of the logical partition to be created, and determines if the address range overlaps or is within the address range of a logical partition that already exists. If so, the command is rejected, the steps 700 terminate, and a logical partition is not created. If not, control passes to step 712, and a logical partition is created using the information received in the command transmitted in step 702. The command received from the entity may include the characteristics in the first and second characteristic sets, the address range of the logical partition, and other parameters required to create the partition. Creating a logical partition may also include adding an entry to the logical partition table 152. After the logical partition is created, the steps 700 terminate.

Figure 8:
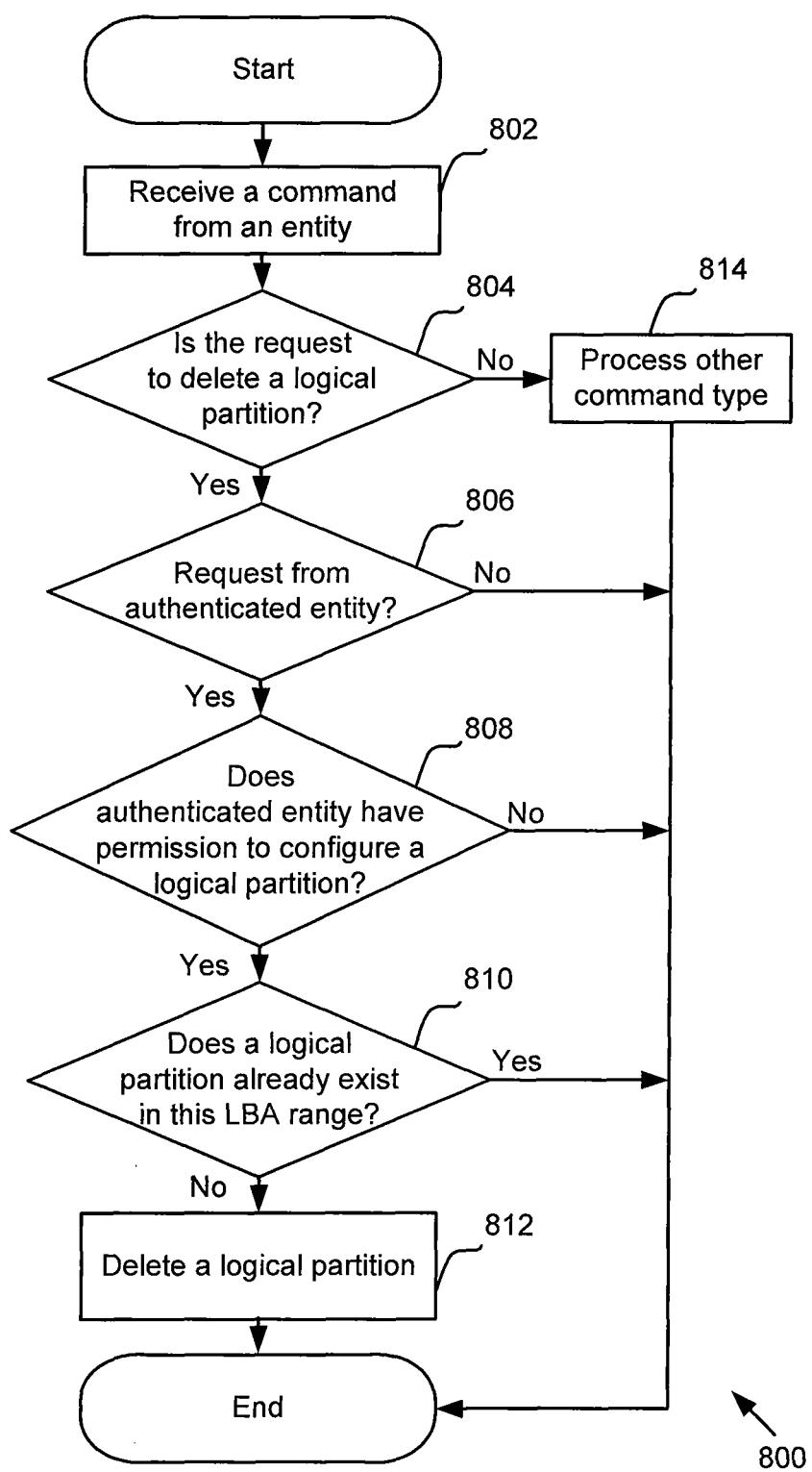
FIG. 8 shows exemplary steps for deleting a logical partition in non-volatile storage within a non-volatile storage device.

FIG. 8 shows exemplary steps 800 for deleting a logical partition in the non-volatile storage media 130 within the non-volatile storage device 120. Referring briefly to FIG. 1, a request is received to delete a logical partition within the non-volatile storage media 130 of the non-volatile storage device 120. The request may be received from the host 110 over communication interface 112. Returning to FIG. 8, at step 802, the controller 140 receives a command from an entity. Control passes to step 804, where the controller 140 examines the command to determine if request is to delete a logical partition. If not, the controller processes the command in step 814, and the steps 800 complete. If the request is to delete a logical partition, control passes to step 806, where the controller 140 determines if the request is received from an authenticated entity. In one embodiment, a request from an authenticated entity is received over a secure channel established between the entity and the controller 140 upon successful authentication. If request to delete a logical partition does not come from an authenticated entity, the steps 800 terminate, and a logical partition is not deleted.

If the entity is currently authenticated, control passes form step 806 to step 808. In step 808, the controller 140 determines if the authenticated entity has permission to delete a logical partition. The access processing logic block 142 utilizes the authorization logic block 142 to check the ACR associated with the authenticated entity. In one embodiment, an ACR may contain an authorization that allows any logical partition to be deleted. In another embodiment, an ACR may contain an authorization that allows a particular logical partition or partitions to be deleted, such as a logical partition previously created by an entity authenticated to that ACR or the parent of that ACR. In one implementation, an entity with permission to configure a logical partition also has permission to delete the logical partition. If the entity is not authorized to delete the partition, the steps 800 terminate, and a logical partition is not deleted.

If the authenticated entity is authorized, the controller acknowledges the request from the entity, and control passes to step 810, where the controller 140 verifies that the specified configured address range or logical partition to be deleted actually exists. If it does not exist, then the controller 140 has received a command to delete a non-existent logical partition, and so the command is rejected, and the steps 800 terminate. If the configured address range or logical partition exists, control passes to step 812, and a logical partition is deleted. Deleting a logical partition may also include removing an entry from the logical partition table 152. In one embodiment, deleting a logical partition also comprises erasing the data within the logical partition. In another embodiment, the data within the address range or logical partition is left untouched. After the logical partition is deleted, the steps 800 terminate.

Figure 9:
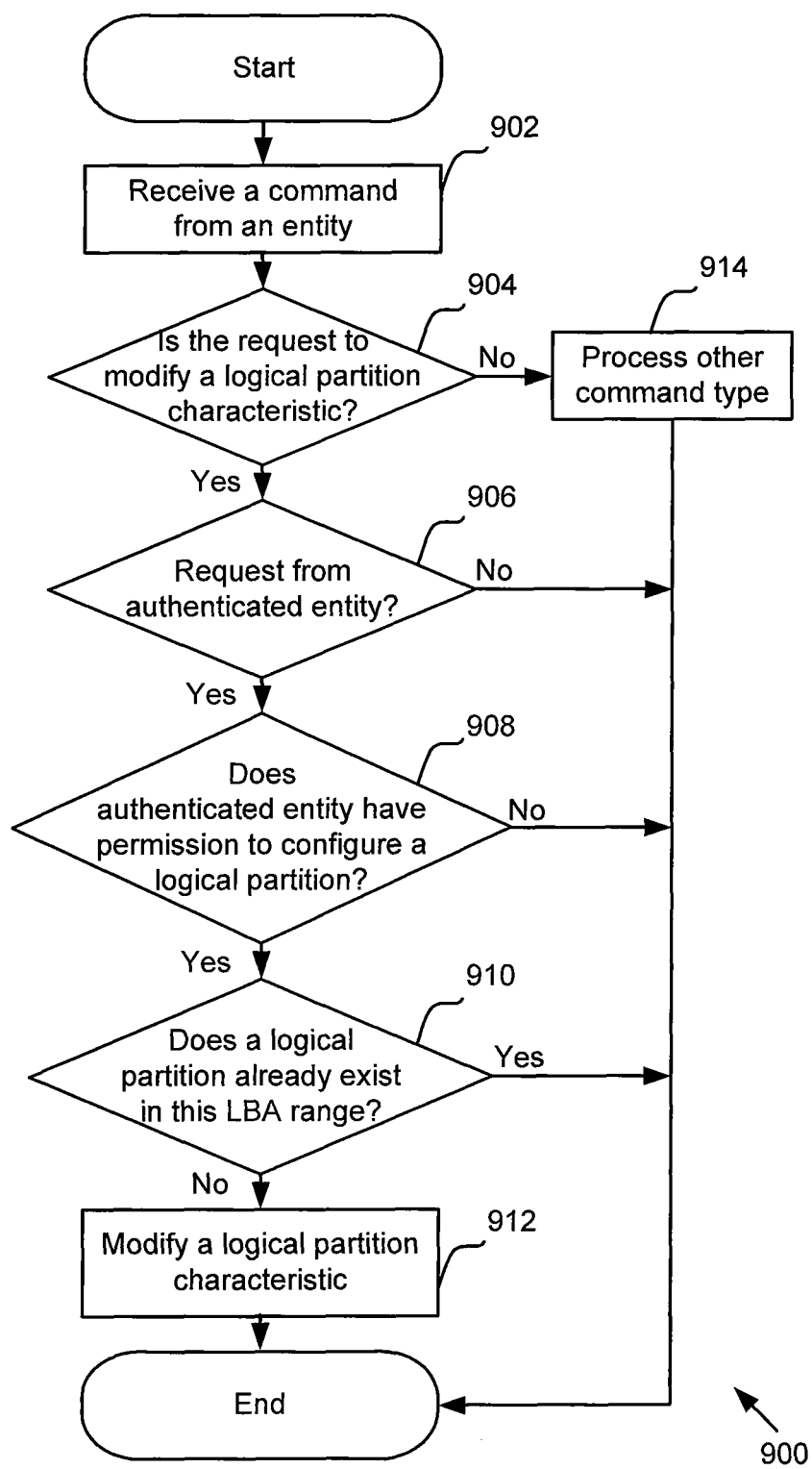
FIG. 9 shows exemplary steps for modifying a logical partition in non-volatile storage within a non-volatile storage device.

FIG. 9 shows exemplary steps 900 for modifying a logical partition in non-volatile storage within a non-volatile storage device. Modifying a logical partition or configured address range may include changing a characteristic, deleting a characteristic, changing the minimum and maximum address ranges associated with a configured address range or partition, or any other configuration, maintenance, or management operation. Referring briefly to FIG. 1, a request is received to modify a logical partition within the non-volatile storage media 130 of the non-volatile storage device 120. The request may be received from the host 110 over communication interface 112. Returning to FIG. 9, at step 902, the controller 140 receives a command from an entity. Control passes to step 904, where the controller determines if the request is to modify a logical partition. If not, the controller processes the command in step 914, and the steps 900 complete. If the request is to modify a logical partition, control passes to step 906, where the controller 140 determines if the request is received from an authenticated entity. In one embodiment, a request from an authenticated entity is received over a secure channel established between the entity and the controller 140 upon successful authentication. If request to modify a logical partition does not come from an authenticated entity, the steps 900 terminate, and a logical partition is not changed.

If the entity is currently authenticated, control passes from step 906 to step 908. In step 908, the controller 140 determines if the authenticated entity has permission to modify a logical partition. The access processing logic block 142 utilizes the authorization logic block 142 to check the ACR associated with the authenticated entity. In one embodiment, an ACR may contain an authorization that allows any logical partition to be modified. In another embodiment, an ACR may contain an authorization that allows a particular logical partition or partitions to be modified, such as a logical partition previously created by an entity authenticated to that ACR or the parent of that ACR. If the entity is not authorized to delete the partition, the steps 900 terminate, and a logical partition is left unchanged.

If the authenticated entity is authorized, the controller 140 acknowledges the request from the entity, and control passes to step 910, where the controller 140 verifies that the specified configured address range or logical partition actually exists. If it does not exist, then the controller has received a command to modify a non-existent logical partition, and so the command is rejected, and the steps 900 terminate. At step 910, if the request is to expand the address range of the partition, the controller 140 also checks if the expanded logical partition will overlap another existing address range or logical partition. If so, the command is rejected, and the steps 900 terminate. Otherwise, control passes to step 912, and a logical partition is modified according to the command received from the entity in step 902. The request may identify the address range or the logical partition, and other parameters required to modify the partition, such as characteristics to from the first and/or second characteristic sets to change or delete. The modification of a logical partition may also include updating an entry in the logical partition table 152. After the logical partition or configured address range is modified, the steps 900 terminate.

Thus, logical partitions or configured address ranges allow the enhanced control of data security, integrity and access control within the non-volatile storage media 130 of the non-volatile storage device 120. One or more of the embodiments disclosed herein may be incorporated within a non-volatile removable media card. One example of a non-volatile removable media card the TrustedFlash™ card, a storage device from SanDisk Corporation of Milpitas, Calif. The non-volatile storage within a TrustedFlash™ card may be divided into public physical partitions and private physical partitions. Without utilizing logical partitions or address ranges associated with characteristics, access to data in public physical partitions may be achieved through standard host commands with few restrictions, or by utilizing specialized access commands once authenticated to an ACR in the SSA system of the TrustedFlash™ device. Access to private physical partitions is physically restricted to entities authenticated to an ACR defined in the SSA system of the TrustedFlash™ device. Access to the data in a private physical partition or a public physical partition can be logically restricted by authorizing access to certain encryption or decryption keys to selected authenticated entities, and by utilizing those keys to encrypt data before storing the data in a private physical partition or a public physical partition.

By defining characteristic sets that are applied to logical partitions or configured address ranges, enhanced control of data security, integrity and access control can be achieved. A TrustedFlash™ device may contain logical partitions in the public physical partitions or the private physical partitions. The logical partitions are associated with characteristic sets that define and/or regulate access requests to a particular address range of the device. In additional to controlling access permissions, a characteristic set may be defined to also control functionality such as encryption, power consumption, and bandwidth consumption. Two characteristic sets may be defined. A first characteristic set is applied when processing an access request to a logical partition when at least one currently authenticated entity is authorized to access the logical partition. A second characteristic set is applied to an access to a logical partition when no currently authenticated entities are authorized to access the logical partition. When an access attempt is made to an address outside of any logical partition, a default characteristic set is applied to process the access request. In combination, the characteristic sets may be combined to provide useful power, performance, encryption, and access configurations customized for individual logical partitions defined within the public or private physical partitions of the TrustedFlash™ device.

The logical partitions are associated with characteristics not typically assigned to or associated with a physical partition, and logical partitions may be more flexibly created, changed, and deleted than the physical partitions in which they reside. Thus, logical partitions complement and enhance the physical partitioning of a TrustedFlash™ device, and the file-by-file protection achieved by using encryption of file data before storage and limiting access to keys. At the same time, the authorizations for logical partition access, creation, deletion, and management may be easily incorporated into the flexible TrustedFlash™ hierarchal tree structure of access control groups and access control records. Through the use of access control groups and access control records, further customization of the entities (applications, users, or hosts) allowed to access, create, delete, or maintain a logical partition are possible.

Although the invention has been described with respect to various system and method embodiments, it will be understood that the invention is entitled to protection within the full scope of the appended claims.

What is claimed is:

1. A method for managing access to an addressable memory location in a storage device, the method comprising:
in a storage device with a storage media that has addressable memory locations, a set of one or more of which being identified by an address range of contiguous addresses associated with a first characteristic and a second characteristic, managing access to such addressable memory locations by:
receiving a request from a requesting entity to access an addressable memory location in the storage media;
applying the first characteristic if the addressable memory location is within the set of addressable memory locations and at that time any entity is currently authenticated to and authorized to access the set of addressable memory locations, wherein an entity that is currently authenticated to and authorized to access the set of addressable memory locations has successfully completed an authentication and authorization process and wherein the requesting entity may access the set of addressable memory locations without having to perform an authentication and authorization process; and
applying the second characteristic if the addressable memory location is within the set of addressable memory locations and at that time no entity is authenticated to and authorized to access the set of addressable memory locations.

2. The method of claim 1, wherein managing the access further comprises applying a default characteristic if the addressable memory location is not within the set of addressable memory locations.

3. The method of claim 1, wherein, if the addressable memory location is within the set of addressable memory locations, managing the access further comprises applying the first characteristic if, at that time, a particular entity making the request is authenticated to and authorized to access the set of addressable memory locations, and applying the second characteristic if, at that time, the particular entity making the request is not authenticated to and not authorized to access the set of addressable memory locations.

4. The method of claim 1, wherein the entity is authenticated to the set of addressable memory locations upon the storage device utilizing an access control record from a tree, wherein the tree comprises nodes organized hierarchically therein, each node comprising at least one access control record, wherein the access control record comprises credentials and permissions for authenticating the entity to the set of addressable locations and authorizing access by the entity to data stored in the set of addressable memory locations.

5. The method of claim 1, further comprising authorizing the entity to access the set of addressable memory locations, wherein the authorizing is performed by the storage device.

6. The method of claim 5, wherein authorizing the entity to access the set of addressable memory locations comprises utilizing an access control record from a tree to authorize the entity to access the set of addressable memory locations, wherein the tree comprises nodes organized hierarchically therein, each node comprising at least one access control record, wherein the access control record comprises credentials and permissions for authenticating the entity and authorizing entity access to data stored in the set of addressable memory locations.

7. The method of claim 5, further comprising delegating an authorization from the entity to an additional entity.

8. The method of claim 7, wherein delegating an authorization from the entity to the additional entity comprises delegating at least one permission of the access control record to an additional access control record.

9. The method of claim 1, further comprising creating an association between the set of addressable memory locations and the first characteristic and the second characteristic.

10. The method of claim 9, wherein creating the association between the logical partition and the first characteristic and the second characteristic comprises creating a new entry in a logical partition table.

11. The method of claim 1, further comprising removing an association between the set of addressable memory locations and the first characteristic and the second characteristic.

12. The method of claim 11, wherein removing the association between the logical partition and the first characteristic and the second characteristic comprises removing an entry from a logical partition table.

13. The method of claim 1, further comprising creating an association between a new set of addressable memory locations and the first characteristic and the second characteristic.

14. The method of claim 1, further comprising changing at least one of the first characteristic and the second characteristic associated with the set of addressable memory locations.

15. The method of claim 1, further comprising retrieving the at least one of the first characteristic and the second characteristic associated with the set of addressable memory locations before applying the at least one of the first characteristic and the second characteristic.

16. The method of claim 15, wherein the first characteristic and the second characteristic are stored in a logical partition table, wherein the logical partition table comprises a plurality of entries, wherein an entry comprises a logical partition identifier associated with the address range of contiguous addresses, the first characteristic, and the second characteristic.

17. The method of claim 1, wherein the set of addressable memory locations is within an addressable range of a partition table.

18. The method of claim 1, wherein the first characteristic and the second characteristic comprise access characteristics.

19. The method of claim 18, wherein the access characteristic comprises a read access permission associated with a read command.

20. The method of claim 18, wherein the access characteristic comprises a write access permission associated with a write command.

21. The method of claim 18, wherein the access characteristic comprises a read access permission associated with a read command, and a write access permission associated with a write command.

22. The method of claim 1, wherein the first characteristic and the second characteristic comprise protection characteristics.

23. The method of claim 22, wherein the protection characteristic comprises an encryption instruction.

24. The method of claim 1, wherein the first characteristic and the second characteristic comprise performance characteristics.

25. The method of claim 24, wherein the performance characteristic is one of a first performance level and a second performance level.

26. The method of claim 1, wherein the first characteristic and the second characteristic comprise power consumption characteristics.

27. The method of claim 26, wherein the power consumption characteristic is one of a first power consumption level and a second power consumption level.

28. The method of claim 1, wherein the storage device is a non-volatile removable memory card.

29. The method of claim 1, further comprising:
receiving a request by an entity to change at least one of the first characteristic and the second characteristic; and
granting the request if the entity is currently authenticated to and authorized to change at least one of the first characteristic and the second characteristic associated with the set of addressable memory locations.

30. The method of claim 29, wherein the request to change at least one of the first characteristic and the second characteristic is a request to delete the first characteristic and the second characteristic, wherein a deleted characteristic is no longer applied.

31. The method of claim 1, wherein the requesting entity's identity is either not specified in the request or is specified but is different from an identity of an entity that is authenticated to and authorized to access the set of addressable memory locations.

32. The method of claim 1, wherein the storage device issues a session ID to an entity that authenticates to and is authorized to access the set of addressable memory locations, and wherein if any entity is authenticated to and is authorized to access the set of addressable memory locations, the storage device applies the first characteristic for any requesting entity, irrespective of whether the requesting entity presents the session ID.

33. A storage device, comprising:
a storage media that has addressable memory locations, a set of one or more of which being identified by an address range of contiguous addresses associated with a first characteristic and a second characteristic; and
a controller operable to:
receive a request from a requesting entity to access an addressable memory location in the storage media;
apply the first characteristic if the addressable memory location is within the set of addressable memory locations and at that time any entity is currently authenticated to and authorized to access the set of addressable memory locations, wherein an entity that is currently authenticated to and authorized to access the set of addressable memory locations has successfully completed an authentication and authorization process and wherein the requesting entity may access the set of addressable memory locations without having to perform an authentication and authorization process; and apply the second characteristic if the addressable memory location is within the set of addressable memory locations and at that time no entity is authenticated to and authorized to access the set of addressable memory locations.

34. The storage device of claim 33, wherein the controller is further operable to apply a default characteristic if the addressable memory location is not within the set of addressable memory locations.

35. The storage device of claim 33, wherein an entity is authenticated to the set of addressable memory locations upon the storage device utilizing an access control record from a tree, wherein the tree comprises nodes organized hierarchically therein, each node comprising at least one access control record, wherein the access control record comprises credentials and permissions for authenticating the entity to the set of addressable locations and authorizing access by the entity to data stored in the set of addressable memory locations.

36. The storage device of claim 33, wherein the storage media further comprises a logical partition table, wherein the logical partition table comprises a plurality of entries, wherein an entry comprises a logical partition identifier associated with the address range of contiguous addresses, the first characteristic, and the second characteristic.

37. The storage device of claim 33, wherein the requesting entity's identity is either not specified in the request or is specified but is different from an identity of an entity that is authenticated to and authorized to access the set of addressable memory locations.

38. The storage device of claim 33, wherein the storage device issues a session ID to an entity that authenticates to and is authorized to access the set of addressable memory locations, and wherein if any entity is authenticated to and is authorized to access the set of addressable memory locations, the storage device applies the first characteristic for any requesting entity, irrespective of whether the requesting entity presents the session ID.

* * * * *